(12) United States Patent  
Lomada et al.

(10) Patent No.: US 10,873,782 B2  
(45) Date of Patent: Dec. 22, 2020

(54) GENERATING USER EMBEDDING REPRESENTATIONS THAT CAPTURE A HISTORY OF CHANGES TO USER TRAIT DATA

(71) Applicant: Adobe Inc., San Jose, CA (US)

(72) Inventors: Vijeth Lomada, San Jose, CA (US); Vidit Bhatia, San Jose, CA (US); Haichun Chen, Sunnyvale, CA (US)

(73) Assignee: ADOBE INC., San Jose, CA (US)

( * ) Notice: Subject to any disclaimer, the term of this patent is extended or adjusted under 35 U.S.C. 154(b) by 111 days.

(21) Appl. No.: 16/149,357

(22) Filed: Oct. 2, 2018

(65) Prior Publication Data

US 2020/0107072 A1   Apr. 2, 2020

(51) Int. Cl.
| | |
|---|---|
| *H04N 21/45* | (2011.01) |
| *H04N 21/845* | (2011.01) |
| *H04N 21/466* | (2011.01) |
| *G06N 7/00* | (2006.01) |
| *G06N 3/08* | (2006.01) |

(52) U.S. Cl.  
CPC ........ *H04N 21/4532* (2013.01); *G06N 3/08* (2013.01); *G06N 7/005* (2013.01); *H04N 21/4666* (2013.01); *H04N 21/8456* (2013.01)

(58) Field of Classification Search  
CPC .......... H04N 21/4532; H04N 21/8456; H04N 21/4666; H04N 21/25891; H04N 21/252; H04N 21/26208; G06N 7/005; G06N 3/08; G06Q 30/0201  
See application file for complete search history.

(56) References Cited

U.S. PATENT DOCUMENTS

| | | | | |
|---|---|---|---|---|
| 10,096,319 | B1* | 10/2018 | Jin | G10L 25/66 |
| 2002/0184047 | A1* | 12/2002 | Plotnick | H04N 21/4532 |
| | | | | 705/1.1 |
| 2006/0212900 | A1* | 9/2006 | Ismail | H04N 21/252 |
| | | | | 725/34 |
| 2013/0117329 | A1* | 5/2013 | Bank | G06F 16/954 |
| | | | | 707/803 |
| 2014/0075464 | A1* | 3/2014 | McCrea | G06F 19/3418 |
| | | | | 725/14 |
| 2015/0186478 | A1 | 7/2015 | Yan et al. | |
| 2016/0232456 | A1 | 8/2016 | Jain et al. | |
| 2016/0274744 | A1* | 9/2016 | Neumann | H04N 21/252 |

(Continued)

OTHER PUBLICATIONS

Hochreiter, Sepp; Schmidhuber, Jürgen; "Long Short-Term Memory"; published in Neural Computation Journal; vol. 9 Issue 8, Nov. 15, 1997; pp. 1735-1780.

(Continued)

*Primary Examiner* — Hai V Tran  
(74) *Attorney, Agent, or Firm* — Keller Jolley Preece

(57) ABSTRACT

The present disclosure relates to systems, non-transitory computer-readable media, and methods for generating user embeddings utilizing an LSTM autoencoder model that captures a history of changes to user trait data. For example, the user embeddings system identifies user trait changes from the user trait data over time as well as generates user trait sequences. Further, the user embeddings system can utilize the user trait sequences to train an LSTM neural network in a semi-supervised manner and generate uniform user embeddings for users.

20 Claims, 10 Drawing Sheets

(56) References Cited

U.S. PATENT DOCUMENTS

2018/0225368 A1 8/2018 Grond
2019/0362220 A1 11/2019 Yap et al.

OTHER PUBLICATIONS

Yuan, Shuhan; Zheng, Panpan; Wu, Xintao; Xiang, Yang; "Wikipedia Vandal Early Detection: from User Behavior to User Embedding" Published 2017 in ECML/PKDD; DOI:10.1007/978-3-319-71249-9_50.

Dai, Hanjun; Wang,Yichen; Trivedi, Rakshit; Song, Le; "Deep Coevolutionary Network: Embedding User and Item Features for Recommendation"; arXiv:1609.03675v4 [cs.LG] Feb. 28, 2017.

U.S. Appl. No. 16/149,418. dated Jul. 8, 2020, Preinterview 1st Office Action.

\* cited by examiner

User Trait Data 310

| User ID | Traits At Timestamp 1 | Traits At Timestamp 2 | Traits At Timestamp 3 |
|---|---|---|---|
| User 1 | T1, T2, T3, T4 | T1, T3, T4, T5 | T2, T4, T5 |
| User 2 | T1, T2 | T2, T4 | T2, T3, T5 |
| User 3 | T1, T2 | T1, T2 | T1 |

*Fig. 3A*

User Trait Sequences 320

| User ID | User Trait Sequences |
|---|---|
| User 1 | T1+, T2+, T3+, T4+, T2-, T5+, T1-, T3-, T2+ |
| User 2 | T1+, T2+, T1-, T4+, T3+, T5+ |
| User 3 | T1+, T2+, T1u, T2u, T2-, T1u |

*Fig. 3B*

GENERATING USER EMBEDDING REPRESENTATIONS THAT CAPTURE A HISTORY OF CHANGES TO USER TRAIT DATA

BACKGROUND

Advancements in computer and communication technologies have resulted in improved digital content dissemination systems for generating and providing digital content to client devices across computing networks. For example, conventional digital content dissemination systems can execute digital content campaigns of various scales that provide customized digital content to client devices of individual users in real-time. Further, conventional digital content dissemination systems can provide digital content to potential customers based on current characteristics, attributes, and traits of each individual.

Indeed, users routinely access millions of websites or applications a day. Furthermore, a single website, application, or Uniform Resource Locator may receive thousands to millions of visits or views a day. With such large quantities of network destinations and visits, web administrators and marketers often seek to gather information concerning users. In some instances, a web administrator may seek to identify a specific segment of users who have certain characteristics or who have demonstrated a certain pattern of behavior.

The amount of analytic data a system may collect for even a single website or application may be unwieldy or too difficult to manage or mine. The amount of data can be particularly problematic for websites or applications that receive thousands or millions of daily visitors or users. Conventional analytics engines often lack the ability to identify and organize captured data in a meaningful way. Even the conventional analytics engines that possess this ability, however, consume significant processing power.

Additionally, conventional analytics engines suffer from a number of technical shortcomings. For example, conventional analytics engines are unable to efficiently utilize heterogeneous user trait data that change as users interact with digital content campaigns and brands. Instead, conventional systems employ static user trait information for users, which offers a limited and incomplete representation of the users. Because user trait data is heterogeneous from one user to the user, conventional digital analytics engines struggle to encode this user trait data into uniform representations.

To demonstrate, users interact with content in various ways and in their own capacities. Indeed, as each user interacts with content, the user can individually undergo changes to their user traits. For example, two users may have the same current user traits, but each experience a different set of trait changes to arrive at the current user traits. Conventional systems incorrectly treat these two users as the same based on the users' current user traits. In another example, two users that interact with the same content in the same order over a similar time period may exhibit different user trait changes from one another.

Because each user's behaviors and interactions with content are different, user trait data becomes vastly different over time from one user to the next, which has prevented most conventional systems from being able to effectively and efficiently compare users based on their progression of user trait data over time. These along with additional problems and issues exist with regard to conventional analytics engines.

BRIEF SUMMARY

Embodiments of the present disclosure provide benefits and/or solve one or more of the foregoing or other problems in the art with systems, non-transitory computer-readable media, and methods for generating vectorized user embeddings for corresponding users based on the user trait data and how user trait data changes over time. The disclosed systems can convert changes to user traits over time into a representative form that is uniform across users. Further, the disclosed systems can utilize the learned user embeddings for various use cases, such as segmentation as well as other deep learning predictive models.

To briefly demonstrate, in one or more embodiments, the disclosed systems identify user trait data that includes a history of user trait changes over time. Based on the user trait data, the disclosed systems generate user trait sequences for each user that indicate how user traits for the user have changed over time. Further, the disclosed systems create and train a neural network to generate uniform user embeddings using the user trait sequences. Then, using one or more trained portions of the neural network, the disclosed systems generate user embeddings for the users utilizing user trait sequences, where the user embeddings represent the journey of a user's traits over time.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

The detailed description provides one or more embodiments with additional specificity and detail through the use of the accompanying drawings, as briefly described below.

FIGS. 3A-3B illustrate diagrams of generating user trait sequences from the user trait data in accordance with one or more embodiments.

DETAILED DESCRIPTION

Figure 1:
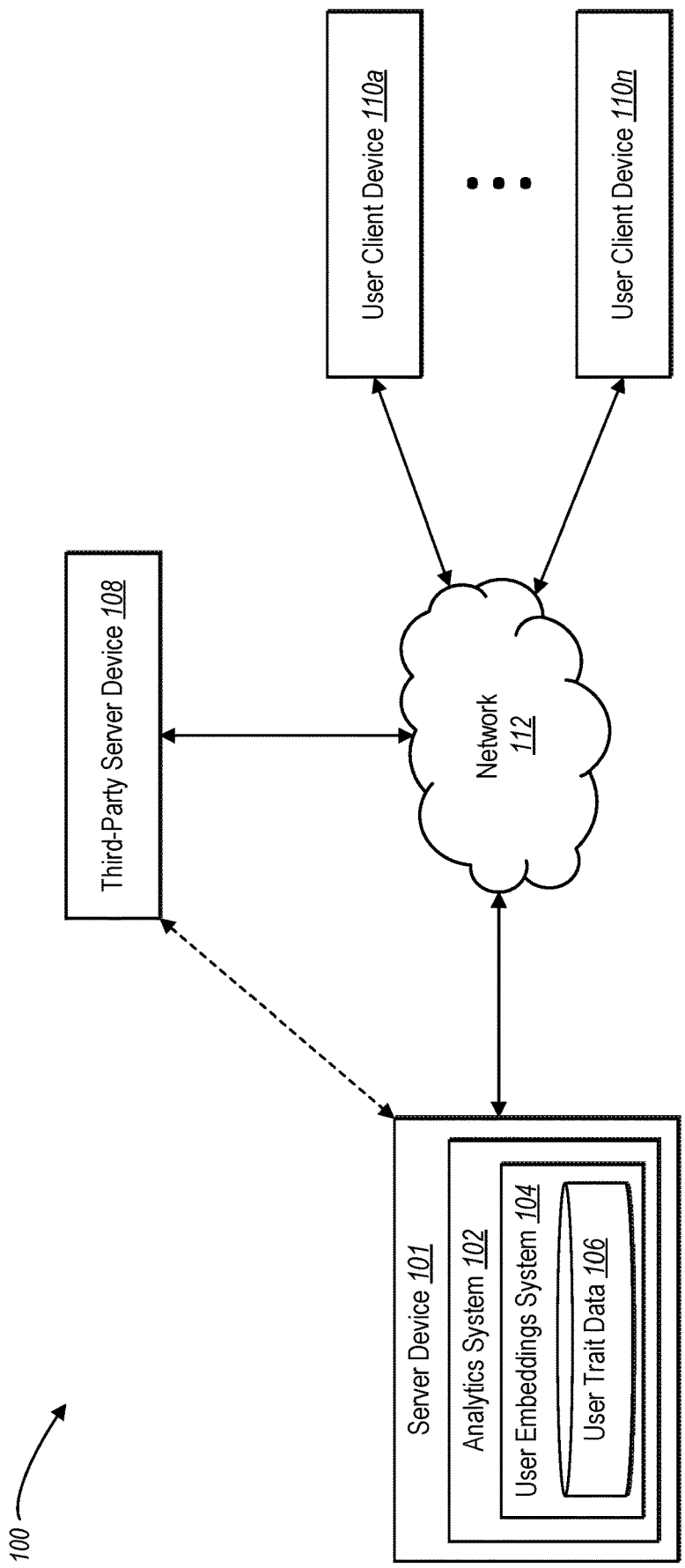
FIG. 1 illustrates a diagram of an environment in which a user embeddings system can operate in accordance with one or more embodiments.

This disclosure describes one or more embodiments of a user embeddings system that employs a neural network to generate vectorized user embeddings for users based on the user trait data and how the user trait data changes over time. For instance, in one or more embodiments, the user embeddings system transforms unorganized data of user trait changes over time into user trait sequences. Further, the user embeddings system can utilize the user trait sequences to train a neural network in a semi-supervised manner and generate vectorized user embeddings for users. Indeed, various embodiments of the user embeddings system provide standardized user embedding representations of each user's trait changes over time.

To illustrate, in one or more embodiments, the user embeddings system receives user trait data that includes a history of user traits for users. Then, the user embeddings system can generate a sequence of user trait changes indicating how user traits associated with each user change over time. In addition, in the above embodiments, the user embeddings system generates and trains a long short-term memory neural network (LSTM network) using the user trait sequences for the purpose of creating learned user embeddings. Indeed, once trained, the user embeddings system can employ portions of the trained LSTM network to generate user embeddings based on user trait sequences such that the user embeddings represent the journey of a user's traits over time, encoded into a single uniform vector representation.

As mentioned previously, the user trait data can provide indications of users changing traits over different points of time. For example, in various embodiments, user trait data includes user traits for users at multiple time intervals, such as on a daily, weekly, and/or monthly basis. Additionally, or alternatively, the user trait data includes user traits that indicate a point in time when a user exhibits a new user trait, changes from one user trait to another, drops a user trait, or maintains a user trait. As described below, user traits include characteristics and attributes associated with a user. Notably, the user traits described herein can change over time, such as age, content interaction habits, purchase behaviors, relationship status, brand preferences, etc.

In addition, as mentioned above, the user trait data is heterogeneous. Indeed, each time a user performs an action that exhibits a user trait, the user embeddings system may add or remove a user trait from the user trait data. Also, because users control their actions (e.g., the amount, frequency, and type of interactions with content), the user trait data can include a number of users that have different numbers and types of user traits occurring at different points in time. Further, due to the variation in user traits associated with each user, the user trait data as a whole is imbalanced and irregular.

As stated above, the user embeddings system generates user trait sequences from the user trait data. For example, in various embodiments, the user embeddings system generates a user trait sequence for each user that indicates when the user adds, removes, or maintains a user trait. Indeed, a user trait sequence can include a string of deltas or changes as a user becomes associated and disassociated with user traits over time. In addition, as further described below, the user embeddings system can generate an initial user trait state for users based on the user traits associated with a first timestamp.

Using the user trait sequences mentioned previously, the user embeddings system can train an LSTM network. In one or more embodiments, the LSTM network is part of an LSTM autoencoder model that includes an encoder and a decoder. For example, in some embodiments, the LSTM network is the encoder in the LSTM autoencoder model. In alternative embodiments, the LSTM network is the decoder in the LSTM autoencoder model. In additional embodiments, the LSTM autoencoder model includes additional neural network layers, such as an embedding layer, a dense layer, a classification layer, and/or a loss layer.

In various embodiments, the user embeddings system can modify the architecture and/or inputs of the LSTM autoencoder model. For example, in some embodiments, the LSTM autoencoder model decodes input from the encoder in reverse order. In one or more embodiments, the user embeddings system provides multiple inputs to the decoder in addition to the encoder output. In various embodiments, the user embeddings system employs different training approaches and inputs to train the LSTM autoencoder model.

Upon training the LSTM autoencoder model, the user embeddings system can utilize portions of the model/neural networks to generate learned user embeddings. For example, the user embeddings system provides one or more user trait sequences to the trained encoder, which outputs user embeddings for corresponding users. These user embeddings are uniform for each user irrespective of the number, order, or type of user traits are associated with each user.

In one or more embodiments, the user embeddings system utilizes the user embeddings to compare any two or more users. For example, the user embeddings system compares the user embeddings of two users to identify similarities and differences between the journey of user trait changes over time between the two users. By comparing groups of users, the user embeddings system can identify clusters and groupings of similar users based on finding similar user embeddings. Further, in some embodiments, the user embeddings system can utilize the user embeddings as features for other machine-learning prediction algorithms.

The user embeddings system provides many advantages and benefits over conventional systems and methods. For example, as mentioned above, the user embeddings system efficiently analyzes heterogeneous data created by user trait changes and encodes the user trait data into a uniform representation. More particularly, by transforming the irregular and imbalanced user trait data into a sequence of user identifiers and training an LSTM network using the user trait sequences, the user embeddings system can more accurately determine the effects, weights, and influences resulting from the complex sequences of trait changes between users and user traits as the user traits change over time. Indeed, the user embeddings system can utilize latent relationships of user trait changes among users to train an LSTM autoencoder model to accurately learn, encode, and reconstruct uniform user embeddings for users.

Because the user embeddings system efficiently processes irregular and imbalanced data, the user embeddings system provides increased flexibility over conventional systems. As stated above, conventional systems have been unable to process heterogeneous sequences of user traits over time. Rather, conventional systems employ a rigid approach that determines user representations based on the current realized traits of users without regard to previous user trait changes that lead the user to arrive at their realized user traits.

The user embeddings system also improves computer efficiency. Indeed, by more accurately and precisely identifying relationships between users based on changes to user traits over time, the user embeddings system can reduce the computing resources required to generate, distribute, and monitor unnecessary digital content. For example, the user embeddings system utilizing the learned user embeddings described herein can more accurately predict the outcome of a task than conventional systems.

As illustrated by the foregoing discussion, the present disclosure utilizes a variety of terms to describe features and advantages of the user embeddings system. Additional detail is now provided regarding the meaning of such terms. For example, as used herein, the term "content" refers to digital data that may be transmitted over a network. In particular, the term "content" includes items such as text, images, video, audio and/or audiovisual data. Examples of digital content include images, text, graphics, messages animations, notifications, advertisements, reviews, summaries, as well as content related to a product or service.

In addition, the term "user trait" refers to an attribute or characteristic associated with a user. In particular, the term "user traits" refers to changeable characteristics that describe the nature and disposition of a user. In various embodiments, users provide information to the user embeddings system or another system that exhibits a user trait, or lack thereof. In alternative embodiments, users manifest a user trait when interacting with content. Some examples of user traits include age, relationship status, marital status, parental status, employment status, and socioeconomic status. Other examples of user traits include a user's location (e.g., home, work, leisure), education level, income, property information (e.g., cars, home, ownership status), shopping preferences and habits, and brand interactions. Still other examples include accomplishments or actions taken by a user, such as whether the user downloaded and/or installed a particular mobile application, starting training for a marathon, or completed a marathon. In sum, user traits can include any distinguishing quality or characteristic possessed by the user.

In various embodiments, user traits are created and/or defined by entities (e.g., marketers) based on static rules. For example, for user traits corresponding to age, an entity can define one user trait as 0-20 years old and other user traits as 21-25, 26-30, 31-35, etc. Then, as a user changes in age, the user trait associated with the user also changes. As another example, a user trait can correspond to whether a user has exhibited a preference for a particular brand. In some cases, the entity can define different levels of interest for a brand or product, such as being sent information about a product via a content item, selecting the content item, buying the product, exhibiting continued interest in the product, and/or showing a lack of interest in the product (e.g., for at least a threshold time period).

As mentioned above, the user embeddings system can generate a user trait sequence. As used herein, the term "user trait sequence" refers to a series of user trait states associated with multiple timestamps. In particular, the term "user trait sequence" includes a string of user trait changes between two or more time points. In various embodiments, a user trait sequence includes the state changes of user traits between two timestamps. For example, a user trait sequence indicates the addition or removal of a user trait between two timestamps. In some embodiments, a user trait sequence indicates when a user trait remains unchanged between two timestamps. As described further below in connection with FIGS. 3A and 3B, the user embeddings system can generate user trait sequences from the user trait data.

As mentioned above, user trait data can include heterogeneous data. As used herein, the term "heterogeneous user trait data" or "heterogeneous data" refers to irregular or imbalanced user trait data between users included in the user trait data. The imbalance between users can be due to users indicating different numbers of user trait changes, interacting with different numbers of content items (i.e., content), providing different user traits signals, etc. For instance, one user is associated with one user trait change in the user trait data while other users are associated with multiple user trait changes. To illustrate, if a user trait sequence for each user is represented within as a vector of user trait changes, then the heterogeneous user trait data includes user vectors of different lengths for users.

As mentioned above, the user embeddings system can train an LSTM network to generate learned uniform user embeddings. The term "machine learning," as used herein, refers to the process of constructing and implementing algorithms that can learn from and make predictions on data. In general, machine learning may operate by building models from example inputs (e.g., user trait data), such as training neural network layers, units, cells, matrices, biases, and/or parameters to make data-driven predictions or decisions. Machine learning can include neural networks (e.g., an LSTM encoder or decoder neural network), cells (e.g., LSTM cells), data-based models (e.g., an LSTM autoencoder model), or a combination thereof.

As used herein, the term "neural network" refers to a machine learning model that can be tuned (e.g., trained) based on inputs to approximate unknown functions. In particular, the term neural network can include a model of interconnected neurons that communicate and learn to approximate complex functions and generate outputs based on a plurality of inputs provided to the model. For instance, the term neural network includes an algorithm (or set of algorithms) that implements deep learning techniques that utilize a set of algorithms to model high-level abstractions in data using semi-supervisory data to tune parameters of the neural network.

In addition, the term "long short-term memory neural network" (or "LSTM network") refers to a neural network that is a special type of recurrent neural network (RNN). An "LSTM network" includes a cell having an input gate, an output gate, and a forget gate as well as a cell input. In various embodiments, the cell remembers previous states and values over time (including hidden states and values) and the three gates control the amount of information that is input and output from a cell. In many embodiments, an LSTM network includes various cells. Additional detail regarding an LSTM cell is provided below in connection with FIG. 4B.

In addition, the user embeddings system can create, train, and utilize an LSTM autoencoder model. As used herein, the terms "LSTM autoencoder model" or "sequence-to-sequence LSTM autoencoder model" refer to a neural network made up of multiple LSTM networks. In particular, the term "LSTM autoencoder model," as used herein, refers to a neural network that includes an LSTM encoder network (or simply "encoder") and an LSTM decoder network (or simply "decoder"), where the encoder provides one or more inputs to the decoder.

In some embodiments, the LSTM autoencoder model includes additional layers during training and/or execution, such as an embedding layer, a dense layer, a classification layer, and/or a loss layer. In one or more embodiments, the LSTM autoencoder model is a data compression algorithm where the compression and decompression functions are data-specific (e.g., meaning that they best compress data similar to what they have been trained on), lossy, and/or learned automatically from examples. Additional detail regarding the LSTM autoencoder model is provided below in connection with FIGS. 4A-4C.

As mentioned above, the user embeddings system can train the LSTM autoencoder model to generate learned user embeddings. As used herein, the terms "user embeddings" or "user embedding representations" refer to a vector of numbers/features that represent the behavior of the user encoded in a pre-defined dimension. The features can be learned by the LSTM autoencoder model (e.g., a "learned" user embeddings represents user embeddings generated by a trained LSTM encoder). In one or more embodiments, the features comprise latent features.

In many embodiments, user embeddings represent the journey of a user over time with respect to user traits as the user acquires, changes, and moves away from user traits. Further, two users with a similar sequence of user trait changes over time will result in similar user embeddings. In various embodiments, the number/pre-defined dimension of representative features in a user embedding can be a hyperparameter of the LSTM autoencoder model and/or learned throughout training the LSTM autoencoder model.

As mentioned above, in some embodiments, the LSTM autoencoder model includes a loss layer that includes has a loss function or loss model to train the LSTM autoencoder model. As used herein, the term "loss function" or "loss model" refers to a function or set of algorithms that determine training error loss. In some embodiments, a machine-learning algorithm can repetitively train to minimize total overall loss. For example, the loss function determines an amount of error loss with respect to training data by analyzing the output of the LSTM autoencoder model (e.g., the decoder) with the ground truth provided by the training data (e.g., a corresponding user trait sequence provided as input to the encoder). The loss function then provides feedback, via back propagation, to one or more networks, layers, units, cells, matrices, biases, and/or parameters of the LSTM autoencoder model for tuning/fine-tuning (e.g., depending on the learning rate). Examples of loss functions include a softmax classifier function (with or without cross-entropy loss), a hinge loss function, and a least squares loss function.

Referring now to the figures, FIG. 1 illustrates a diagram of an environment 100 in which the user embeddings system 104 can operate. As shown in FIG. 1, the environment 100 includes a server device 101 and user client devices 110a-110n. In addition, the environment 100 includes a third-party server device 108 (e.g., one or more webservers). Each of the devices within the environment 100 can communicate with each other via a network 112 (e.g., the Internet).

Although FIG. 1 illustrates a particular arrangement of components, various additional arrangements are possible. For example, the third-party server device 108 communicates directly with the server device 101. In another example, the third-party server device 108 is implemented as part of the server device 101 (shown as the dashed line).

In one or more embodiments, users associated with the user client devices 110a-110n can access content (e.g., content items) provided by the analytics system 102 and/or the third-party server device 108 via one or more media channels (e.g., websites, applications, or electronic messages). As FIG. 1 illustrates, the environment 100 includes any number of user client devices 110a-110n.

As shown, the server device 101 includes an analytics system 102, which can track the storage, selection, and distribution of content as well as track user interactions with the content via the user client devices 110a-110n. The server device 101 can be a single computing device or multiple connected computing devices. In one or more embodiments, the analytics system 102 facilitates serving content to users (directly or through the third-party server device 108) via one or more media channels to facilitate interactions between the users and the content.

In some embodiments, the analytics system 102 includes, or is part of, a content management system that executes various content campaigns across multiple digital media channels. Indeed, the analytics system 102 can facilitate audiovisual content campaigns, online content campaigns, email campaigns, social media campaigns, mobile content campaigns, as well as other campaigns. In various embodiments, the analytics system 102 manages advertising or promotional campaigns, which includes targeting and providing content via various digital media channels in real time to large numbers of users (e.g., to thousands of users per second and/or within milliseconds of the users accessing digital assets, such as websites).

In one or more embodiments, the analytics system 102 employs the user embeddings system 104 to facilitate the various content campaigns. In alternative embodiments, the analytics system 102 hosts (or communicates with) a separate content management system (e.g., a third-party system) that manages and facilitates various content campaigns. In these embodiments, the analytics system 102 can communicate user embeddings to aid the third-party system with analytics, targeting, segmentation, or other data analysis.

As shown in FIG. 1, the analytics system 102 includes the user embeddings system 104. The user embeddings system 104 also includes user trait data 106 that indicates which user trait a user exhibited and when (e.g., a timestamp). As mentioned above, the user embeddings system 104 generates uniform user embedding representations from the user trait data 106. A high-level description of the user embeddings system 104 is provided with respect to FIG. 2. FIGS. 3A-7 provide further detail regarding the user embeddings system 104.

As mentioned above, the environment 100 includes the user client devices 110a-110n. The analytics system 102 (or the third-party server device 108) can provide content to, and receive indications of user traits from, the user client devices 110a-110n. In various embodiments, the analytics system 102 communicates with the third-party server device 108 to provide content to the user client devices 110a-110n. For instance, the analytics system 102 instructs the third-party server device 108 to employ specific media channels when next providing content to target users based on the user embeddings (e.g., using the user embeddings to make content distribution predictions).

In one or more embodiments, the user client devices 110a-110n and/or server device 101 may include, but are not limited to, mobile devices (e.g., smartphones, tablets), laptops, desktops, or any other type of computing device, such as those described below in relation to FIG. 8. In addition, the third-party server device 108 (and/or the server device 101) can include or support a web server, a file server, a social networking system, a program server, an application store, or a digital content provider. Similarly, the network 112 may include any of the networks described below in relation to FIG. 8.

The environment 100 can also include an administrator client device. An administrator user (e.g., an administrator, content manager, or publisher) can utilize the administrator client device to manage a content campaign. For example, a content manager via the administrator client device can provide content and/or campaign parameters (e.g., targeting parameters, target media properties such as websites or other digital assets, budget, campaign duration, or bidding parameters). Moreover, the content manager, via the administrator client device, can view visual depictions of learned user embeddings. For example, with respect to a content campaign, the administrator employs the administrator client device to access the user embeddings system 104 and view graphical user interfaces that include user embeddings across one or more content campaigns.

With respect to obtaining user trait data 106, in one or more embodiments the analytics system 102 and/or the user embeddings system 104 monitors various user interactions, including data related to the communications between the user client devices 110a-110n and the third-party server device 108. For example, the analytics system 102 and/or the user embeddings system 104 monitors interaction data that includes, but is not limited to, data requests (e.g., URL requests, link clicks, input fields, multiple-input selections), time data (e.g., a timestamp for clicking a link, a time duration for a web browser accessing a webpage, a timestamp for closing an application, a time duration of viewing or engaging with content), path tracking data (e.g., data representing webpages a user visits during a given session), demographic data (e.g., an indicated age, sex, or socioeconomic status of a user), geographic data (e.g., a physical address, IP address, GPS data), and transaction data (e.g., order history, email receipts).

The analytics system 102 and/or the user embeddings system 104 can monitor user data in various ways. In one or more embodiments, the third-party server device 108 tracks the user data and then reports the tracked user data to the analytics system 102 and/or the user embeddings system 104. Alternatively, the analytics system 102 and/or the user embeddings system 104 receives tracked user data directly from the user client devices 110a-110n. In particular, the analytics system 102 and/or the user embeddings system 104 may receive user information via data stored on the client device (e.g., a browser cookie, cached memory), embedded computer code (e.g., tracking pixels), a user profile, or engage in any other type of tracking technique. Accordingly, the analytics system 102 and/or the user embeddings system 104 can receive tracked user data from the third-party server device 108, the user client devices 110a-110n, and/or the network 112.

Based on receiving user data, in various embodiments, the user embeddings system 104 can determine user traits for users. For example, in some embodiments, the user explicitly provides information indicating a new user trait or a modification to an existing user trait. In alternative embodiments, the user embeddings system 104 identifies or infers one or more user traits based on received user data with respect to a user interacting with content. For example, upon a user being to purchases diapers and/or other regular baby items on a regular basis, the user embeddings system 104 can determine that the user trait associated with the user's parental has changed.

Figure 2:
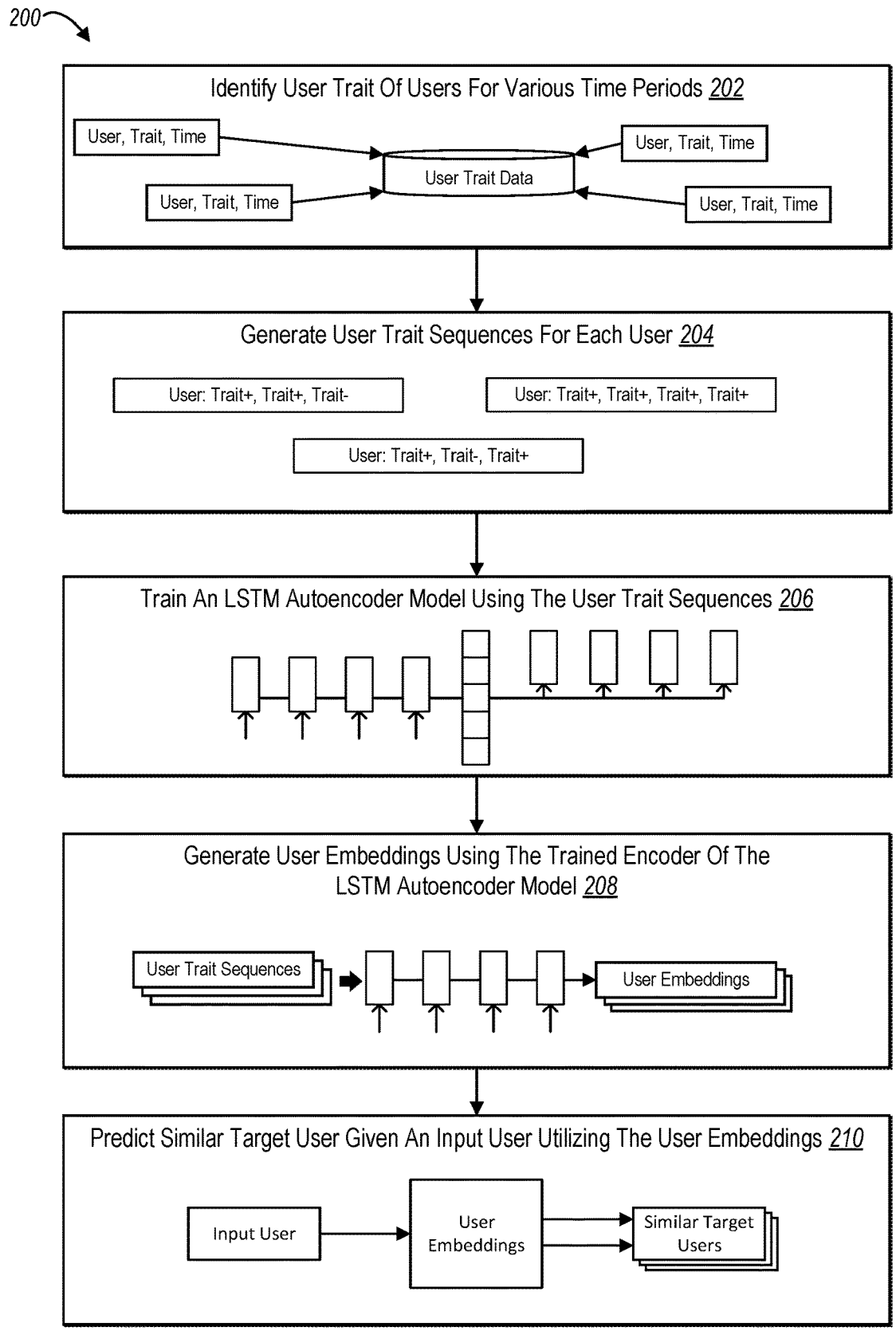
FIG. 2 illustrates a high-level schematic diagram of learning user embeddings from user trait data by training a long short-term autoencoder model in accordance with one or more embodiments.

Turning now to FIG. 2, an overview is provided regarding how the user embeddings system 104 generates user embeddings. In particular, FIG. 2 illustrates a general process 200 of learning user embeddings from user trait data utilizing an LSTM autoencoder model. In one or more embodiments, the user embeddings system 104 described with respect to FIG. 1 implements the general process 200 to train and utilize the LSTM autoencoder model.

As shown in FIG. 2, the user embeddings system 104 identifies 202 user traits of users (i.e., user trait data) for various time periods. Various examples of the user embeddings system 104 tracking/receiving user trait data for various times are provided above. For example, the user embeddings system 104 receives indications of user traits directly from users. In additional embodiments, the user embeddings system 104 infers or identifies user traits for user actions with content, as described above.

Further, as shown, the user embeddings system 104 can store the user trait data, such as in a table or database. For example, in association with each user trait identified at a given timestamp, the user embeddings system 104 stores a user identifier of the user, a user trait identifier, and a timestamp.

As shown the user embeddings system 104 generates 204 user trait sequences for each user. To illustrate, in various embodiments, the user embeddings system 104 creates a string or vector of user trait changes for each user to indicate when and how the user's traits change over time. Indeed, the user trait sequence is far more than a snapshot of a user's current user traits but rather, a history of how the user has changed and progressed over time. Additional regarding generating user trait sequences is provided below in connection with FIGS. 3A and 3B.

FIG. 2 also includes the user embeddings system 104 training 206 an LSTM autoencoder model using the user trait sequences. In one or more embodiments, the user embeddings system 104 creates an LSTM autoencoder model that includes an encoder and a decoder. The user embeddings system 104 utilizes the user trait sequences to train the LSTM autoencoder model in a semi-supervised manner, by back propagating error loss until the LSTM autoencoder model generates learned user embeddings. Additional detail regarding creating and training the LSTM autoencoder model is provided below with respect to FIGS. 4A-4C.

Once trained, the user embeddings system 104 can utilize the trained LSTM autoencoder model to generate learned user embeddings. As shown, the user embeddings system 104 generates 208 user embeddings using the trained encoder (i.e., an LSTM encoder neural network) of the LSTM autoencoder model. For example, the user embeddings system 104 provides one or more user trait sequences to the trained encoder, which generates learned user embeddings. In particular, the trained encoder produces a uniform vector of values that represent features corresponding to a user's traits. Regardless of the length of an input user trait sequence, the trained encoder generates a user embedding of a predetermined and uniform length. Additional detail regarding generating learned user embeddings is provided below with respect to FIG. 5.

Once generated, the user embeddings can allow for various data analysis. For example, FIG. 2 includes the user embeddings system 104 predicting 210 similar target users given an input user utilizing the user embeddings. For example, in various embodiments, the user embeddings system 104 can compare the user embeddings of a given user to other user embeddings to find similar or matching users to the given user.

Indeed, the uniform homogeneous length and equivalent features within a user embeddings vector enable the user embeddings system 104 to easily compare users based on user traits in a manner not previously achieved by conventional systems. In one or more embodiments, the user embeddings system 104 can form groups or clusters of similar users based on the user embeddings and/or expand a segment of users. Further, the user embeddings system 104 can utilize the user embeddings for a user to determine how likely the user is to perform a future action (e.g., click on a URL link) based on the actions of similar users as determined by the user embeddings.

Turning now to FIGS. 3A and 3B, additional detail is provided regarding generating user trait sequences from the user trait data. To illustrate, FIG. 3A shows a table of user trait data table 310, which is arranged by timestamp. As shown, the user trait data table 310 includes a user identifier 312 (i.e., "User ID") and along corresponding user traits (e.g., user trait identifiers T1-T5) assigned with either a first timestamp 314, a second timestamp 316, or a third timestamp 318.

For ease in explanation, the user trait data table 310 includes a truncated list of users as well as user trait timestamps. While a truncated table of users and timestamps is displayed, the user embeddings system 104 can store and organize user trait data table 310 of various size (e.g., large number of users or large number of timestamps). In addition, the user trait data table 310 can include additional columns of information about the user traits or the users. For example, in some embodiments, the user traits are organized by trait type, category, priority, or relevance.

As the user trait data table 310 illustrates, each user is associated with a list of user traits that correspond to a given timestamp. Indeed, the presence of a user trait in the user trait data table 310 indicates detection of the user trait for the user at the given timestamp. As shown, the first user (i.e., User 1) is associated with user traits T1, T2, T3, and T4 at the first timestamp 314; user trait sequence T1, T3, T4, and T5 at the second timestamp 316, and user traits T2, T4, and T5 at the third timestamp 318. The user trait data table 310 also shows the user traits detected for User 2 and User 3 at the first timestamp 314, the second timestamp 316, and the third timestamp 318.

In some embodiments, the user embeddings system 104 monitors (e.g., directly or indirectly) user traits at regular intervals, such as every one or more hours, days, weeks, or months. For example, the first timestamp 314 corresponds to the start of a first week, the second timestamp 316 corresponds to the start of a second week, and the third timestamp 318 corresponds to the start of a third week. In alternative embodiments, the timestamps represent a time range, and the user traits that are detected within the time rage of a timestamp are assigned to the timestamp. For instance, if the timestamp corresponds to one-hour intervals and the user embeddings system 104 detects the user trait T4 for User 2 during the second hour, the user embeddings system 104 associates the user trait T4 with User 2 at the second timestamp 316.

In additional embodiments, the user trait data table 310 is filtered or limited to include particular user traits. For example, the user embeddings system 104 maintains a user trait data table 310 that is particular to a predefined set of user traits (e.g., user traits associated with a brand, product, and/or service). At each timestamp interval, the user embeddings system 104 determines whether users possess one of these user traits. For instance, in some embodiments, the user embeddings system 104 utilizes the same metrics at each timestamp and for each user to determine whether the user had a given user trait at the timestamp. To illustrate, at each timestamp, the user embeddings system 104 determines whether each of Users 1-3 are associated with user traits T1-T5. In alternative embodiments, the user trait data table 310 includes all user traits detected for users, and if needed, the user embeddings system 104 can filter out one or more user traits at a later time.

For each timestamp interval, the user embeddings system 104 can further organize the user traits assigned to a user. For example, in one or more embodiments, the user embeddings system 104 arranges the user traits alphanumerically based on the user trait identifiers (e.g., T1 before T2). In alternative embodiments, the user embeddings system 104 arranges the user traits based on their corresponding timestamps. For instance, if both T1 and T2 are assigned to a user for a given timestamp interval, and T2 was detected before T1, the user embeddings system 104 arranges T2 before T1 within the timestamp interval.

In alternative or additional embodiments, to determining the presence of user traits at timestamp intervals, the user embeddings system 104 updates the user trait data table 310 as information is received. For example, when a user interacts with content or provides user information exhibiting a user trait, the user embeddings system 104 includes the detected user trait in the user trait data table 310. In this manner, the user trait data table 310 is not necessarily arranged by timestamp intervals but includes an indication of a user trait along with a timestamp of when the user trait was. For instance, the user trait data table 310 includes the user identifier 312, the user trait, and a timestamp of when the user trait is detected.

The user trait data table 310 can include various types of user traits. For example, many user traits indicate a particular user preference for a brand, a content item, an entity, or a style. These user traits are present as long as the user exhibits the preference. In some embodiments, a user trait can expire or decay over time (e.g., the user trait goes stale). For instance, the user embeddings system 104 can remove a user trait for a user if the user has not displayed the user trait for a predefined time period, such as a month, a year, or three intervals. Similarly, some user traits indicate the occurrence of an event and are not carried over across intervals, such as a user trait indicating a product purchase or other user interaction with content.

In other embodiments, the user embeddings system 104 maintains a user trait until the user indicates an alternative user trait. For example, a user trait associated with a user's particular age (or age range) is maintained until the user grows beyond the associated age. Here, the user embeddings system 104 replaces the user trait for the particular age with a new user trait representing a new age (or new age range). As another example, the user traits associated with marital status can correspond to a user being single, married, or divorced, (or unknown), where the user always maintains one of these user traits within the user trait data table 310.

Indeed, the user embeddings system 104 can include groups of user traits that include mutually exclusive user traits where users assigned with one user trait cannot be assigned another user trait from the group. In some embodiments, the user embeddings system 104 includes groups of user traits that are complementary, where being assigned to one user trait infers or causes the user embeddings system 104 to inquire about another related user trait. For example, when a user purchases baby diapers, the user embeddings system 104 determines whether the user also purchased other baby products, such as wipes.

As mentioned above, the user embeddings system 104 can generate user trait sequences from the user trait data. To illustrate, FIG. 3B shows a user trait sequence table 320 that includes the user identifier 312 (i.e., "User ID") and user trait sequences 324. In some embodiments, the user trait sequence table 320 is stored as vectors that include the user identifier 312 of users and their user trait sequences 324.

In various embodiments, the user embeddings system 104 generates the user trait sequences 324 for each user by comparing user traits at different timestamps. More particularly, the user trait sequences 324 indicate how user traits change over time for each user. To illustrate, the user trait sequences 324 show a string of user trait changes (e.g., deltas) for each user that include user trait identifiers (e.g., T1-T5) along with change status indicators or symbols for each listed user trait. Notably, in the illustrated embodiment, the user trait sequences 324 do not include timestamp information.

As mentioned, each entry of the user trait sequences 324 includes a change status symbol. In various embodiments, change status symbols indicate the addition of a new user trait (represented with a "+" symbol) or the removal of a user trait (represented with a "−" symbol). In additional embodiments, the change status symbols also indicate an unchanged user trait (represented with a "u" symbol).

The following description provides examples of the user embeddings system 104 generating a user trait sequence from user trait data. As shown, in the user trait data table 310 in FIG. 3A, User 2 is assigned user traits T1 and T2 at the first timestamp 314, T2 and T4 at the second timestamp 316, and T2, T3, and T5 at the third timestamp 318. To generate a user trait sequence for User 2, in one or more embodiments, the user embeddings system 104 first identifies the user traits from the first timestamp 314 (i.e., T1 and T2). As these user traits are new (or newly identified), the user embeddings system 104 includes these user traits to the user trait sequence with an additional change status symbol, as shown (i.e., "T1+, T2+").

Next, the user embeddings system 104 identifies the user traits from the second timestamp 316 (i.e., T2 and T4). In various embodiments, the user embeddings system 104 compares the user trait sequence in the first timestamp 314 to user traits in the second timestamp 316 to determine user trait changes for the user between the two times. For instance, the user embeddings system 104 determines that T1 was present at the in the first timestamp 314 but missing from the second timestamp 316. Therefore, the user embeddings system 104 includes T1 to the user trait sequence with a removal change status symbol, as shown (i.e., "T1"). Further, the user embeddings system 104 determines that T4 was added during the second timestamp 316. Accordingly, the user embeddings system 104 includes T4 and to User 2's user trait sequence with an additional change status symbol, as shown (i.e., "T4+").

The user embeddings system 104 can repeat the actions for User 2's traits in the third timestamp 318. As shown, the user embeddings system 104 identifies the user traits from the third timestamp 318 (i.e., T2, T3, and T5), compares those user traits to the user traits in the previous timestamp (i.e., T2 and T4), and includes user trait changes to User 2's user trait sequence (i.e., "T4−, T3+, T5+").

As described above, when initializing a user trait sequence for a user, the user embeddings system 104 can take a "snapshot" of user traits from the first timestamp 314 and utilize these user traits to begin a user trait sequence for the user. Often, a user has been displaying and hiding user traits well before the snapshot. However, when the user embeddings system 104 does not have access to previous user traits, the snapshot at the first timestamp 314 provides the user embeddings system 104 with a starting point to begin generating a user trait sequence for a user.

In some embodiments, the user embeddings system 104 indicates when a user trait is maintained from one time period (i.e., timestamp) to the next. For example, as shown in connection with the user trait sequence for User 3, the user embeddings system 104 indicates when a user trait is unchanged, as indicated with the change status symbol of "u". Indeed, as shown, User 3's user trait sequence includes "T1u" to indicate that User 3 has maintained an association with the user trait T1 through the second timestamp 316 and the third timestamp 318. However, without the unchanged status symbol, the user trait sequence for User 3 would be T1+, T2+, T2−.

While examples of the user embeddings system 104 generating user trait sequences 324 from user trait data are provided above, the user embeddings system 104 can utilize alternative actions to generate the user trait sequences 324. For example, rather than including removals of user traits before additions of user traits for a subsequent timestamp, the user embeddings system 104 can order the additions before the removals. Further, in some embodiments, the user embeddings system 104 prioritizes user traits by their identifier (e.g., alphanumerically) before indicating additions and removals of timestamp for a timestamp.

Further, in embodiments where the user trait data table 310 is organized by timestamp without intervals, the user embeddings system 104 can employ a set of rules for determining when a user trait is to be removed from the user trait sequence of a user. For example, the user embeddings system 104 removes a user trait after a set period of time or upon the user trait expiring (where different user trait types have different expiration durations). In one or more embodiments, the user embeddings system 104 includes removals of user traits in the user trait data table 310 described above. For instance, the user embeddings system 104 provides an indication or timestamp in the user trait data table 310 when a user trait expires.

As mentioned above, the user trait sequences 324 omit timestamp information. Indeed, the user trait sequences 324 show a user's journey over time with respect to the user showing and hiding user traits, rather than showing when a user exhibits a particular trait. In addition, omitting timestamps enables the user embeddings system 104 to encode a user's behaviors and patterns with respect to user traits as the user traits relate to each other, rather than when specific traits occurred. Further, omitting timestamps enables the user embeddings system 104 to better pair the sequence of user traits for one user to that of other users who may share similar patterns and behaviors to the user.

Also, as shown, a user trait sequence for a user can add and remove the same user trait at different times. For example, User 1 adds T2 in the first timestamp 314, drops T2 in the second timestamp 316, then adds T2 back in the third timestamp 318. By including a user's interaction with the same user trait over time as well as other user traits, the user embeddings system 104 can encode behavioral information about users in the user's user trait sequence, which results in better training and application of the LSTM autoencoder model in determining accurate user embeddings.

As shown, the user trait sequences 324 can vary in length. For example, User 3 has a user trait sequence that is three entries long (not counting the unchanged user trait sequence) while the user trait sequence of User 1 is nine entries long. As described above, the user embeddings system 104 can generate heterogeneous user trait sequences that vary in length and provide the different length user trait sequences 324 to the LSTM autoencoder model to generate user embeddings of uniform lengths, as further described below.

In some embodiments, the user embeddings system 104 can filter out user traits from the user trait sequences 324. For example, in a similar manner as described above, the user embeddings system 104 can select particular user traits or omit user traits from the user trait sequences 324. For instance, the user embeddings system 104 omits user traits not related to particular content or a brand, before providing the user trait sequences 324 to the LSTM autoencoder model for training.

Figure 4A:
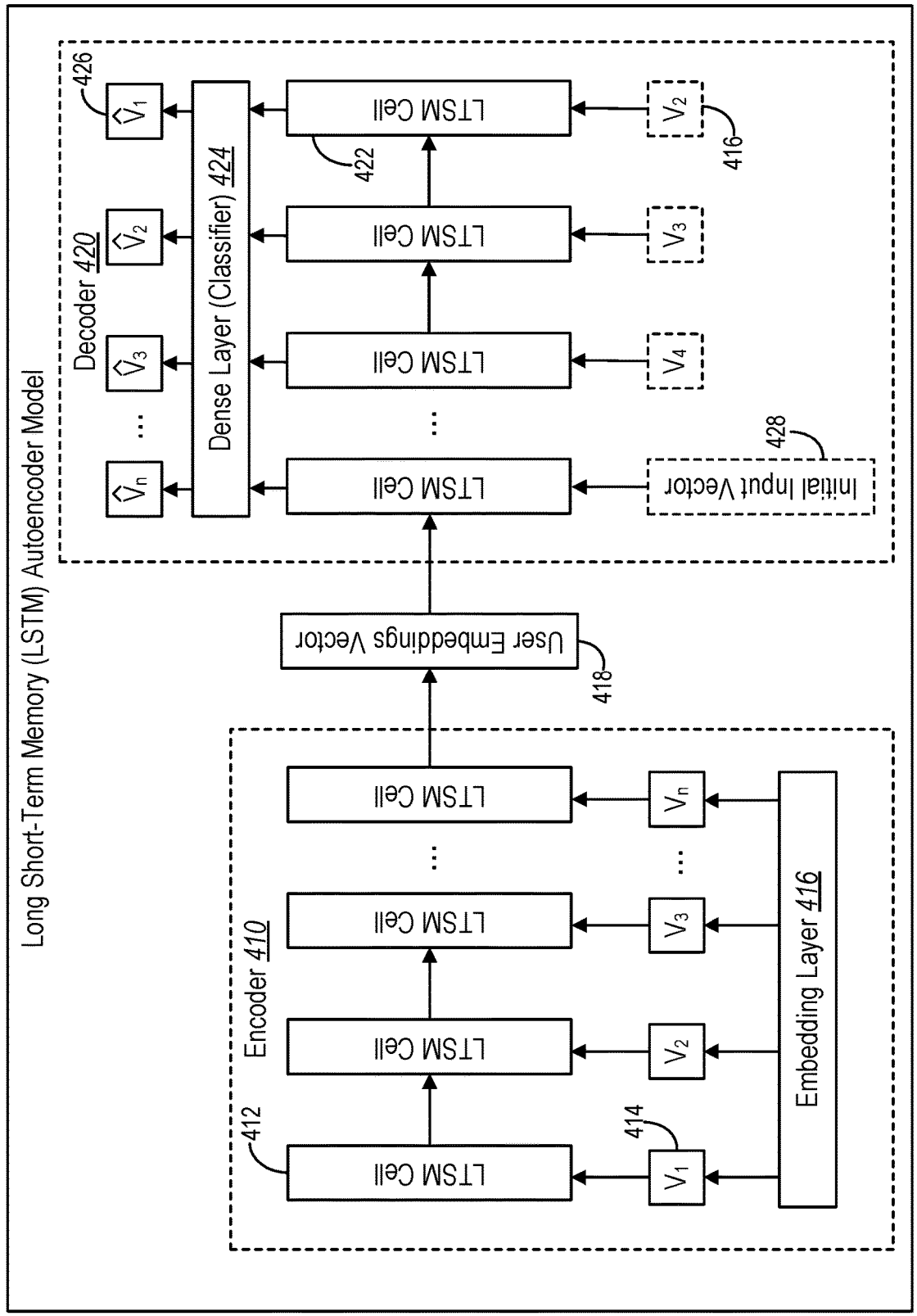
FIGS. 4A-4C illustrate diagrams of training the long short-term autoencoder model to generate user embeddings in accordance with one or more embodiments.
Figure 4B:
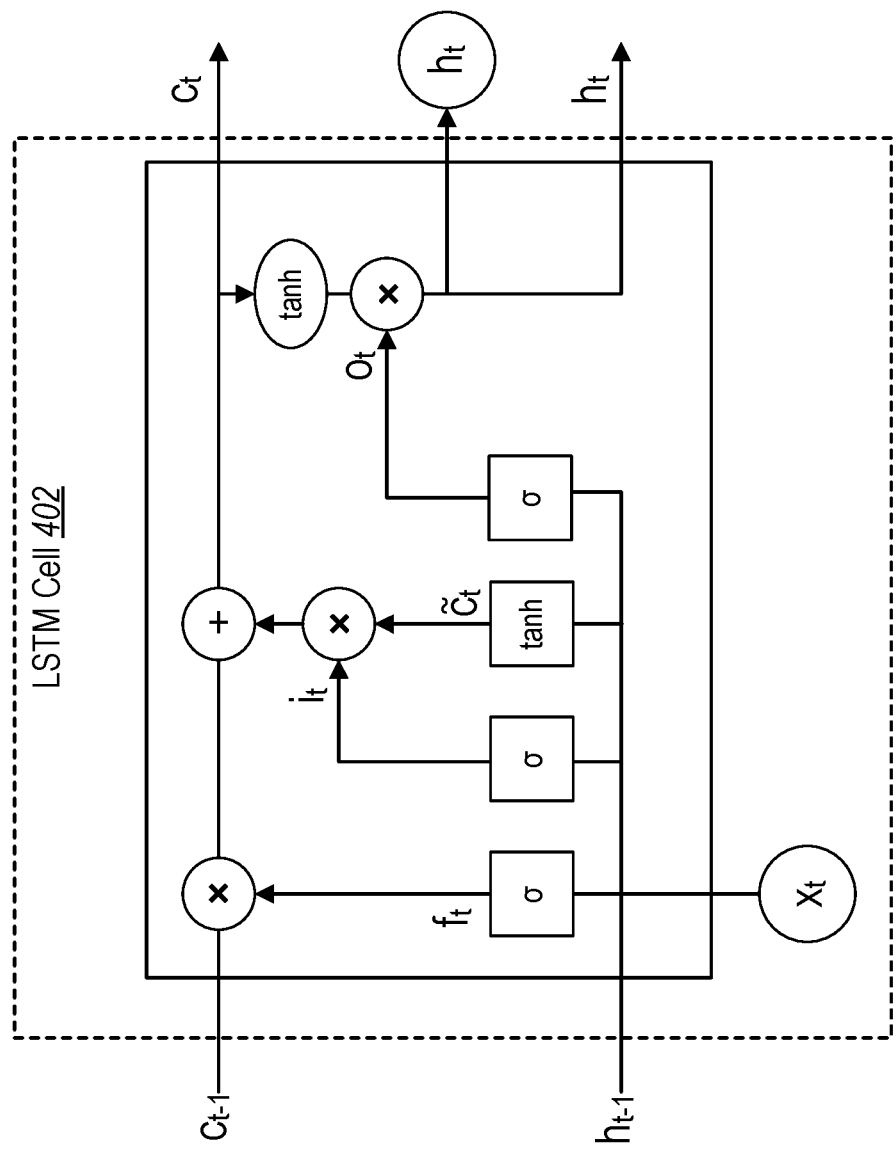
Figure 4C:
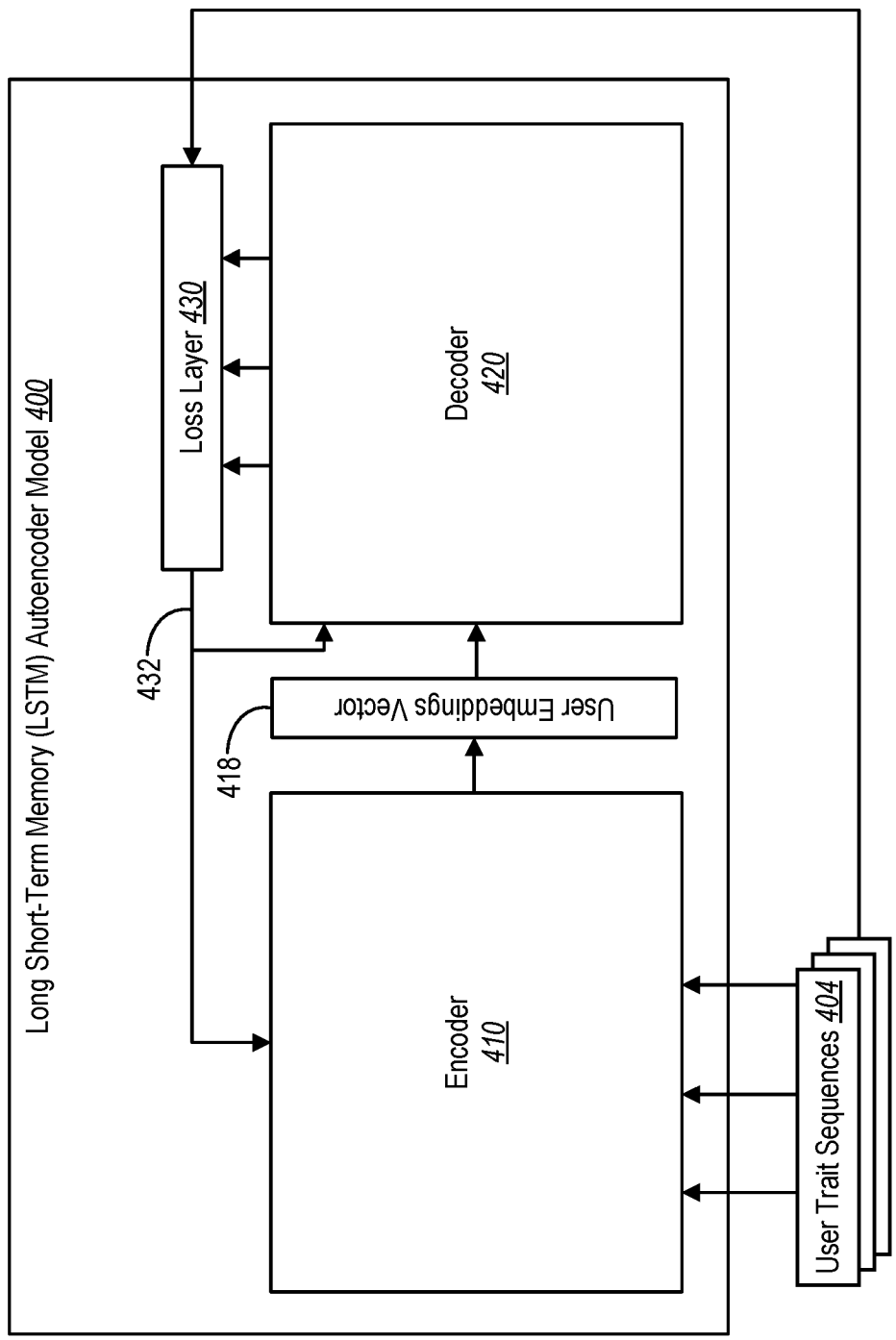

Turning now to FIGS. 4A-4C, additional detail is provided with respect to the LSTM autoencoder model. More particularly, FIG. 4A illustrates example architecture of a long short-term memory (LSTM) autoencoder model 400. FIG. 4B illustrates an example of an LSTM cell. FIG. 4C illustrates training the LSTM autoencoder model 400 to generate user embeddings based on user trait sequences. In various embodiments, the user embeddings system 104 creates and trains the LSTM autoencoder model.

As recently mentioned, FIG. 4A provides example architecture of the LSTM autoencoder model 400. As shown, the LSTM autoencoder model 400 includes an encoder 410 and a decoder 420. In one or more embodiments, the encoder 410 and the decoder 420 are LSTM networks, as described above. For example, as shown in FIG. 4A, the encoder 410 includes LSTM cells 412 (e.g., LSTM units) and the decoder 420 likewise includes LSTM cells 422. LSTM cells are further described below in connection with FIG. 4B.

As mentioned previously, the user embeddings system 104 utilizes the generated user trait sequences described above to train the LSTM autoencoder model 400. For instance, the user embeddings system 104 trains the encoder 410 to learn how to generate user embedding vectors from an input user trait sequence. The user embeddings system 104 simultaneously trains the decoder 420 to accurately reconstruct the input user trait sequence from the encoded user embeddings vector. Additional detail regarding training the LSTM autoencoder model 400 is provided below in FIG. 4C.

Turning now to the description of the encoder 410, as shown, the encoder 410 includes LSTM cells 412, input vectors 414 and an embedding layer 416. As an overview, the embedding layer 416 receives user trait sequences and encodes the user trait sequences into input vectors 414. The LSTM cells 412 generate a user embeddings vector 418 based on the input vectors 414.

More particularly, the embedding layer 416 can encode user trait changes in a user trait sequence (e.g., each entry in the user trait sequence) into the input vectors 414 that indicates to the encoder 410 which user trait is being added or removed for a user. The embedding layer 416 can utilize a variety of methods to encode the user trait sequences into the input vectors 414. For example, the embedding layer 416 can employ a simplistic approach, such as one-hot encoding. In other examples, the embedding layer 416 employs an embedding index that provides a dense representation of user trait sequence and their relative context to other user traits. For example, the embedding layer 416 includes an embedding index matrix that is tuned during training to provide suitable representations of each user trait and user trait change to the encoder 410.

To illustrate, in one or more embodiments, the embedding layer 416 creates a representation where similar user traits have a smaller Euclidean distance to each other than user traits that are distinct from each other (e.g., not similar at all based on the surrounding context.) For example, the user traits of "age below 20" and "age above 20" would have closer representations to each other than the user traits "preference for organic food" and "married." In some embodiments, the embedding layer 416 employs one or more dictionaries (e.g., a mapping of user traits to identifiers) to look up and store learned index representations for user traits, as described below in connection with FIG. 4C. The embedding layer 416 then outputs an input vector for each user trait change that includes the learned indexed embedding corresponding to the user trait change.

In alternative embodiments, the embedding layer 416 utilizes one-hot encoding to convert a user trait sequence into a one-hot encoded vector that serves as an input vector. For instance, the embedding layer 416 generates an input vector that is sized to include the number of user traits from the user trait data. Then, for each entry in a user trait sequence, the embedding layer 416 encodes the entry in the one-hot encoded vector with a one (i.e., 1) and the remaining user trait sequence with zeros (i.e., 0). In this manner, the input vector 414 is encoded with a one-hot vector representation to indicate which user trait is being provided as input to encoder 410.

Further, in additional embodiments, the embedding layer 416 encodes the user traits between zero and one (i.e., [0-1]) when the user trait change indicates adding the user trait and between zero and minus one (i.e., [0-1]) when the user trait change indicates removing the user trait. Alternatively, the encoded input vectors can be expanded in size (e.g., length) to indicate separate entries (e.g., values) for adding, removing, and/or maintaining a user trait.

As shown in the encoder 410, the number of LSTM cells 412 can vary to match the number of input vectors 414. More particularly, the encoder 410 (and the decoder 420) can represent dynamic LSTM networks that adjust in size to equal the heterogeneously sized input vectors 414, while still producing homogeneous user embeddings of a uniform size. Indeed, the encoder 410 can receive an input user trait sequence of any length and generate a uniformed size user embeddings vector 418.

To illustrate, a user trait sequence that includes nine entries (e.g., User 1 from FIG. 3B) can cause the user embeddings system 104 to generate an encoder 410 to generate nine input vectors 414 and nine LSTM cells 412. Then, when presented with the user trait sequence of User 3, the user embeddings system 104 creates an encoder 410 that includes three input vectors 414 and LSTM cells 412. In some cases, a user trait sequence includes dozens, hundreds, or even thousands of entries. In alternative embodiments, the encoder adds padding or masking outputs to compensate for user trait sequences of differing lengths during training.

As mentioned above, regardless of the size of a user trait sequence, the encoder 410 generates a user embeddings vector 418 that is a uniform length, often relatively small compared to the length of the user trait sequences. In some embodiments, the size of the user embeddings vector 418 is a hyperparameter defined before training. For example, the user embeddings vector 418 is set at a length of 16 entries, meaning that the user embeddings system 104 includes 16 encoded features that represent users given their user trait sequence. Indeed, a user embeddings vector 418 contains latent information with respect to user traits. For instance, the user embeddings vectors represent all the sequential information for each user with respect to how the user changes user traits over time.

As shown in FIG. 4A, the encoder 410 passes the user embeddings vectors to the decoder 420, which reconstructs the user embeddings vectors into target user trait sequences (i.e., predicted user trait sequence). In many respects, the decoder 420 is similar to the encoder 410. For example, the decoder 420 includes LSTM cells 422 that can correspond in type and number to the LSTM cells 412 in the encoder 410 (having different weights, biases, and parameters after training). Indeed, the architecture of the LSTM cells 422 in the decoder 420 align with the architecture of the LSTM cells 412 in the encoder 410. As mentioned previously, FIG. 4B provides example architecture of LSTM cells.

In addition, the decoder 420 includes a dense layer 424. The dense layer 424 learns to predict the target user trait sequence from the learned user embedding representation. For example, the dense layer 424 generates prediction vectors 426 that are utilized to reconstruct a user trait sequence. In particular, each of the prediction vectors 426 outputted from an LSTM cell is sized to include each potential user trait change (e.g., match the size of the user trait change dictionary). For each entry in a prediction vector, the dense layer 424 determines a probability that the next user trait change in the user embeddings vector 418 matches the corresponding user trait change. In many embodiments, the total probabilities in each prediction vector sum to one (i.e., 1). Then, using the highest probabilities from each of the prediction vectors 426, the user embeddings system 104 can generate a predicted user trait sequence (e.g., a target user trait sequence) that is intended to replicate the corresponding input user trait sequence.

In various embodiments, the dense layer 424 includes a classifier, such as a softmax regression classifier. The softmax regression classifier determines the probability, that the next user trait change from the user embeddings vector 418 is similar to a known user trait change, as described above. In many embodiments, the dense layer 424 includes weights, parameters, and algorithms that are tuned during training of the LSTM autoencoder model 400.

In one or more embodiment, the decoder 420 predicts a target user trait sequence that is designed to replicate an input user trait sequence. For example, if the input user trait sequence is T1+, T2+, T1−, T3+, then the decoder 420 learns to output the same sequence. In other embodiments, the decoder 420 outputs the target user trait sequence in reverse order (e.g., T3+, T1−, T2+, T1+). Outputting the target user trait sequence in reverse order corresponds to decoding each entry of the sequence in reverse order.

Indeed, because the user embeddings vector 418 provided to the decoder 420 includes encoded information about the entire input user trait sequence in sequential order, decoding in reverse order enables the decoder 420 to utilize more signals and information from the user embeddings vector 418 from the outset as well as sequentially unpack the user trait sequence. Further, decoding each entry of a sequence in reverse order enables the user embeddings system 104 to train the LSTM autoencoder model 400 more quickly than conventional autoencoder models.

Moreover, when decoding the user embeddings vector 418 in reverse order, the user embeddings system 104 can copy the last LSTM cell from the encoder 410 to the first LSTM cell of the decoder 420. For example, in various embodiments, the first LSTM cell of the decoder 420 includes the same weights, biases, and/or parameters of the last LSTM cell from the encoder 410. In this manner, the decoder 420 can more quickly learn to correctly decode the user embeddings vector 418. In alternative embodiments, each of the LSTM cells 422 in the decoder are randomly initialized or initialized to default weights and parameters.

To aid in the decoding process, in one or more embodiments, the LSTM autoencoder model 400 provides inputs (e.g., helper vectors) to the decoder 420 to help in decoding the user embeddings vector 418. For example, the LSTM autoencoder model 400 adds (e.g., sums) or includes embedding representations before the user embeddings vector 418 is provided to the decoder 420 that encode the decoder 420 with the ordinal user traits, thus improving and the decoding process and accelerating training.

To illustrate, as shown in FIG. 4A, the LSTM autoencoder model 400 provides an initial input vector 428 to the first of the LSTM cells 422 of the decoder 420. In one or more embodiments, the initial input vector 428 includes a vector generated by the encoder 410, such as a vector output from the last LSTM cell of the encoder 410. In some embodiments, the initial input vector 428 includes a current hidden state vector, a previous hidden state vector, a history vector, a clock vector, a current state vector, and/or a previous state vector. In some embodiments, the initial input vector 428 includes a tag, such as a start tag that indicates to the first LSTM cell to start decoding the user embeddings vector 418. In a few embodiments, the initial input vector 428 includes random data. Additionally, in one or more embodiments, the LSTM autoencoder model 400 does not include the initial input vector 428 to the first of the LSTM cells 422 of the decoder 420.

Similarly, the LSTM autoencoder model 400 and/or decoder 420 can provide helper input vectors to other of the LSTM cells 422. For example, as shown in FIG. 4A, the decoder 420 provides the subsequent LSTM cells with the input vectors 414 (in reverse order) that convey an indication of the previous user trait change in the user trait sequence. In this manner, the decoder 420 can more quickly train and learn to predict accurate target user trait sequences. Indeed, the decoder 420 an employ enforced teaching during training, as further described below.

In some embodiments, such as the illustrated embodiment, the decoder 420 provides the input vectors 414 as input to the LSTM cells 422 where the input vectors 414 match those from the encoder 410. For example, the input vector of V4 is used to decode the user embeddings vector 418 to predict $\hat{V}3$ (e.g., the next user trait change in the target user trait sequence). Similarly, the input vector of V3 is used to decode the user embeddings vector 418 to predict $\hat{V}2$. In alternative embodiments, the decoder 420 provides input vectors to the LSTM cells 422 where the input vectors are obtained from the output of the dense layer 424 corresponding to the previous LSTM cell. For example, rather than provide V4 to the second LSTM cell as shown, the decoder 420 utilizes $\hat{V}4$ to predict $\hat{V}3$.

As mentioned above, FIG. 4B illustrates an example of an LSTM cell 402 (e.g., an LSTM unit), such as the LSTM cells 412 of the encoder 410 or the LSTM cells 422 of the decoder 420. In many embodiments, the LSTM cell 402 represents a middle cell in a sequence of LSTM cells. In other embodiments, the LSTM cell 402 represents the first or last LSTM cell in a sequence.

In general, the LSTM cell 402 serves to provide memory to a neural network that enables the neural network to effectively learn and apply long-term dependencies. To illustrate, the LSTM cell 402 includes a cell state (i.e., line $C_{t-1}$ to $C_t$), as shown in FIG. 4B passing through the top of the LSTM cell 402. As shown, $C_{t-1}$ represents the cell state of a previous LSTM cell, $C_t$ represents the cell state of the current LSTM cell, and t represents time.

In various embodiments, the LSTM cell 402 can add or remove information to the cell state by utilizing gates. The gates comprise sigmoid neural network layers and are shown as boxes in the LSTM cell 402. More particularly, the gates include a forget gate (i.e., $f_t$), an input gate (i.e., $i_t$), and an output gate (i.e., $o_t$). Each of the gates is also associated with a pointwise multiple operation (i.e., $\otimes$ or × within a circle). A sigmoid neural network layer outputs a value between zero and one to indicate how much of each component should pass through the gate. In addition, the LSTM cell 402 includes a cell input neural network layer (i.e., tan-h), that creates a vector of new candidate values (i.e., $\tilde{C}_t$) between −1 and 1. Further, the LSTM cell 402 includes additional pointwise operations, such as addition and tan-h.

In various embodiments, the LSTM cell 402 receives inputs from two sources and each of the four neural network layers (e.g., the three gates and the input). The first source is the current user trait change $x_t$ (shown as $V_t$ in FIG. 4A). The second source is the previous hidden states (i.e., $h_{t-1}$) of all previous LSTM cells in the encoder 410. Further, the LSTM cell 402 outputs the current state (i.e., $C_t$) and a hidden state vector (i.e., $h_t$). In one or more embodiments, the LSTM cell 402 is represented mathematically as:

$$f_t = \sigma(W_f[x_t, h_{t-1}] + b_f) \quad (1)$$

$$i_t = \sigma(W_i[x_t, h_{t-1}] + b_i) \quad (2)$$

$$\tilde{C}_t = \tan h(W_c[x_t, h_{t-1}] + b_c) \quad (3)$$

$$C_t = C_{t-1} \odot r_t + i_t \odot \tilde{C}_t \quad (4)$$

$$o_t = \sigma(W_o[x_t, h_{t-1}, c_t] + b_o) \quad (5)$$

$$h_t = o_t \odot \tan h(C_t) \quad (6)$$

In the above equations, σ represents the logistic sigmoid function. In addition, $f_t$, $i_t$, $o_t$, and $C_t$, respectively represent the input gate, forget gate, output gate, and the cell input activation vectors, all of which are the same size as the hidden vector $h_t$. In addition, each W represents a weight matrix, where the weight matrices subscripts correspond to the forget, input, and output gate matrices (e.g., randomly initialized and tuned through training). Further, b represents bias vectors for the forget, input, and output gates. Moreover, ⊙ represents the Hadamard product or entrywise product.

In some embodiments, the LSTM cell 402 can comprise a different configuration and/or be a variation of the LSTM cell 402 shown in FIG. 4B. For example, in one or more embodiments, the LSTM cell adds peephole connections. In another embodiment, the LSTM cell adds forget units.

As mentioned above, FIG. 4C illustrates training the LSTM autoencoder model 400 to generate user embeddings based on user trait sequences. The LSTM autoencoder model 400 in FIG. 4C can represent the LSTM autoencoder model 400 described above with respect to FIG. 4A. For simplicity, the LSTM autoencoder model 400 in FIG. 4C has been simplified to hide the LSTM cells from the encoder 410 and the decoder 420. Similarly, the embedding layer, input vectors, initial input vector, and dense layer have also been hidden from the encoder 410 and the decoder 420 in FIG. 4C.

In various embodiments, to train the LSTM autoencoder model 400, the user embeddings system 104 provides the user trait sequences 404 (e.g., an input user trait sequence) to the encoder 410. More particularly, as described above, the encoder 410 utilizes the embedding layer to generate input vectors, which are provided to the LSTM cells. Further, for each of the input user trait sequences, the encoder 410 generates a user embeddings vector 418.

In addition, the LSTM autoencoder model 400 provides the user embeddings vector 418 to the decoder 420, which is trained to reconstruct the input user trait sequence. As described previously, the LSTM autoencoder model 400 can copy the last LSTM cell of the encoder 410 to the first LSTM cell of the decoder 420. Moreover, in some embodiments, the LSTM autoencoder model 400 can provide additional input to the first LSTM cell of the decoder 420, such as a current hidden state vector, a previous hidden state vector, a history vector, a clock vector, a current state vector, and/or a previous state vector, as described above. In some embodiments, the LSTM autoencoder model 400 provides a tag, such as a start tag, that indicates to the first LSTM cell of the decoder 420 to start decoding the user embeddings vector 418.

As explained previously, the decoder 420 includes LSTM cells and a dense layer that the decoder 420 utilizes to predict the next user trait change in a sequence based on the user embeddings vector 418. In various embodiments, the decoder 420 utilizes a softmax regression classifier to determine the probability that the next user trait change from the user embeddings vector 418 is similar to a known user trait change, as further described below.

Further, as shown in FIG. 4C, the LSTM autoencoder model 400 also includes a loss layer 430. In one or more embodiments, the loss layer 430 is included in the decoder 420. In general, the LSTM autoencoder model 400 utilizes the loss layer 430 to train the encoder 410 and the decoder 420 using prediction error 432 via back propagation. For example, the LSTM autoencoder model 400 employs the error loss feedback vector (i.e., the prediction error 432) to tune the weighted matrices, biases, and parameters of the LSTM cells in the encoder 410 and the decoder 420. Further, the LSTM autoencoder model 400 employs the prediction error 432 to tune the embedded layer in the encoder 410 and the dense layer in the decoder 420, as described below.

More particularly, the loss layer 430 receives the predicted user trait sequence reconstructed from the dense layer of the decoder 420 and compares the predicted user trait sequence to a ground truth sequence. The ground truth sequence matches the input user trait sequence from the user trait sequences 404 provided to the encoder 410. For each user trait change in a user trait sequence, the loss layer 430 determines an amount of error loss due to an inaccurate prediction. Further, the loss layer 430 can sum the error loss into a combined error loss feedback vector (i.e., the prediction error 432) for each training iteration.

Moreover, using the prediction error 432, the user embeddings system 104 can train the LSTM autoencoder model 400 via back propagation until the overall loss is minimized (e.g., the encoder 410 provides a user embeddings vector 418 that the decoder 420 successfully decodes). Indeed, the user embeddings system 104 can conclude training when the LSTM autoencoder model 400 converges, total training loss amount is minimized, and/or the decoder 420 successfully decodes user embedding vectors encoded by the encoder 410.

As mentioned above, the user embeddings system 104 trains the LSTM autoencoder model 400 in a semi-supervised manner. In particular, the user embeddings system 104 is inhibited from employing a supervised method because the user trait data is not labeled, and the uniqueness and variety of user traits prevent labels from denoting these interactions. On the other hand, the user embeddings system 104 is inhibited from employing an unsupervised method because the irregular and imbalanced user trait data prevent the neural network to train itself (e.g., convergence does not occur). However, by employing a dynamic RNN, such as the LSTM autoencoder model 400, the user embeddings system 104 can utilize the user trait data as labels to train the LSTM autoencoder model in a semi-supervised manner.

As mentioned above, the LSTM autoencoder model 400 can train the embedding layer within the encoder 410 to better index or encode numeric values to show relationships between similar traits. For example, in one or more embodiments, the embedding layer utilizes a dictionary that creates a trait-to-identifier mapping (or vice versa) and includes encoded numeric values for each user trait change. Initially, the encoded numeric values in user traits dictionary for each mapping can be randomized. However, through training, the LSTM autoencoder model 400 can update each mapping to reflect more accurate relationship values among related user trait change.

Further, in additional or alternative embodiments, the LSTM autoencoder model 400 can utilize user traits mapped to identifiers in connection with the dense layer in the decoder 420 to predict the user trait change that will next appear in a predicted user trait sequence. For example, the dense layer provides a probability that each entry in the dictionary will be the next user trait change in the predicted user trait sequence. In these embodiments, the LSTM autoencoder model 400 can likewise utilize the prediction error 432 to tune mappings within the dictionary to yield more accurate predictions by the dense layer (e.g., softmax regression classifier).

In various embodiments, the user embeddings system 104 employs teacher enforcement to train the LSTM autoencoder model 400. For example, during training of the decoder 420, the LSTM autoencoder model 400 shares the previous user trait change to each LSTM cell from the input user trait sequence rather than the user trait change predicted by the dense layer with respect to the previous LSTM cell. Indeed, enforced teaching includes providing a user trait from a user trait sequence for a user and a given timestamp to the decoder 420 in place of providing a prediction user trait output generated by the decoder 420 for a previous timestamp.

Moreover, in some embodiments, the user embeddings system 104 employs training using a stochastic optimization method such as an Adam optimizer, as known in the art. Further, in one or more embodiments, the user embeddings system 104 employs a learning rate of $1e^{-3}$ (or another hyperparameter) during training, and in further embodiments, decreases the learning rate by half for every x (e.g., 10,000) iteration. Still, in various embodiments, the user embeddings system 104 separates the user trait sequences 404 into training and testing groups for training, as is known in the art.

Figure 5:
FIG. 5 illustrates a diagram of utilizing the trained long short-term autoencoder model to generate learned user embeddings in accordance with one or more embodiments.

Turning now to FIG. 5, additional detail is provided with respect to generating user embeddings from a trained LSTM autoencoder model. To illustrate, FIG. 5 shows utilizing the trained LSTM autoencoder model 500 to generate learned user embeddings. More particularly, FIG. 5 illustrates an example embodiment of the user embeddings system 104 generating learned user embeddings 518 from user trait sequences 502 by utilizing a trained encoder 510 within a trained LSTM autoencoder model 500.

In one or more embodiments, the user embeddings system 104 receives user trait sequences 502. For example, as explained previously, the user embeddings system 104 generates the user trait sequences 502 from user trait data. For instance, the user trait sequences 502 include a user trait sequence for each user that indicates the order of the user trait changes for the user. In some embodiments, the user embeddings system 104 otherwise obtains or receives the user trait sequences 502.

As shown, the user embeddings system 104 provides user trait sequences 502 to the trained LSTM autoencoder model 500. In response, the trained LSTM autoencoder model 500 feeds the user trait sequences 502 to the encoder 510, which includes a trained embedding layer 516. As mentioned above, the embedding layer 516 is trained to learn encoded numeric values that indicate the relationship of each user trait change within a user trait sequence to the LSTM cells of the encoder 510.

More particularly, upon receiving the user trait sequences 502, the embedding layer 516 indexes each user trait change (e.g., user trait delta) in a user trait sequence into an input vector. The input vectors are then fed to the LSTM cells having trained weights, biases, and parameters. The LSTM cells of the encoder 510 generate learned user embeddings 518 for each of the user trait sequences 502. As described above, the learned user embeddings 518 for each user provide a uniform and homogeneous representation of a user's trait interactions over time, which conventional systems previously struggled to achieve.

In addition, upon obtaining the learned user embeddings 518 for each user, the user embeddings system 104 can perform additional actions to identify users that share similar contexts with each other with respect to user traits and/or user interactions. In particular, the user embeddings system 104 can utilize the user embeddings to identify other users that share the same behaviors, patterns, traits, and habits of a given user or a given set of users based on each user's user traits. Notably, the user embeddings system 104 can determine user comparisons using the learned user embeddings 518 because each of the user embeddings is stored as a uniform homogeneous vector irrespective of the number of user trait changes a given user has provided. For example, in one or more embodiments, the user embeddings system 104 utilizes the learned user embeddings 518 to perform various use cases like clustering segmentation, segment expansion, and as input to other deep learning/traditional predictive models.

FIGS. 4A-4C and FIG. 5 described various embodiments of training an LSTM autoencoder model and generating user embeddings for users. Accordingly, the actions and algorithms described in connection with FIGS. 4A-4C and FIG. 5 provide example structure for performing a step for generating user embeddings for the plurality of users that encode how traits change over time utilizing the user trait sequences. More particularly, the actions and algorithms described in training the LSTM autoencoder model 400 with respect to FIGS. 4A-4C as well as using the trained LSTM autoencoder model 400 to obtain user embeddings with respect to FIG. 5 can provide structure for performing a step for generating user embeddings for the plurality of users that encode how traits change over time utilizing the user trait sequences.

Figure 6:
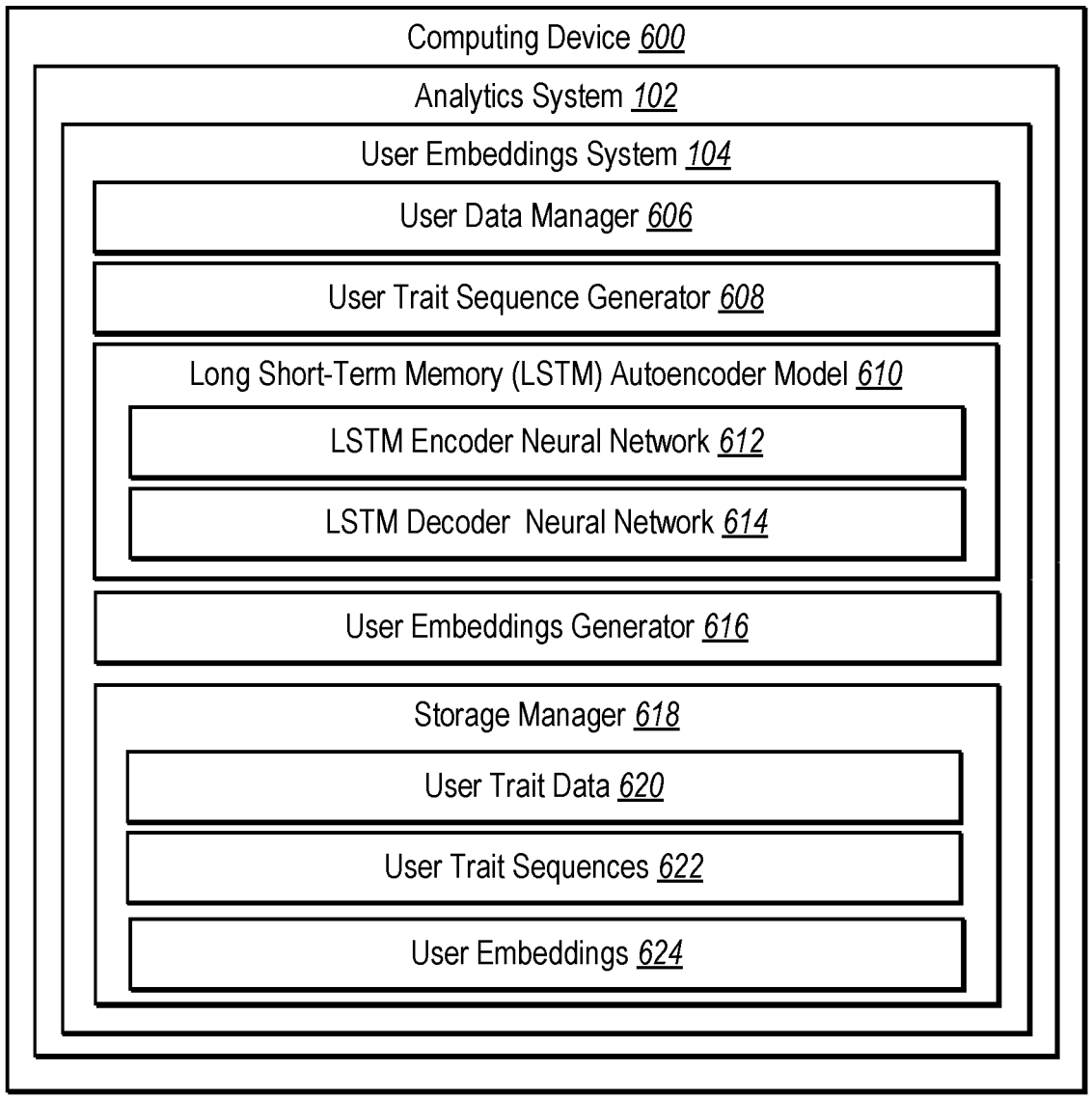
FIG. 6 illustrates a schematic diagram of a user embeddings system in accordance with one or more embodiments.

Referring now to FIG. 6, additional detail will be provided regarding the capabilities and components of the user embeddings system 104 in accordance with one or more embodiments. In particular, FIG. 6 shows a schematic diagram of an example architecture of the user embeddings system 104 located within an analytics system 102 (described previously) and hosted on a computing device 600. The user embeddings system 104 can represent one or more embodiments of the user embeddings system 104 previously described.

As shown, the user embeddings system 104 is located on a computing device 600 within an analytics system 102, as described above. In general, the computing device 600 may represent various types of computing devices (e.g., the server device 101, the third-party server device 108, or an administrator client device). In some embodiments, the computing device 600 represents the user client devices 110a-110n. To demonstrate, in various embodiments, the computing device 600 is a non-mobile device, such as a desktop or server, or a client device. In other embodiments, the computing device 600 is a mobile device, such as a mobile telephone, a smartphone, a PDA, a tablet, a laptop, etc. Additional details with regard to the computing device 600 are discussed below as well as with respect to FIG. 8.

As illustrated in FIG. 6, the user embeddings system 104 includes various components for performing the processes and features described herein. For example, the user embeddings system 104 includes a user data manager 606, a user traits sequence generator 608, a long short-term memory (LSTM) autoencoder model 610, a user embeddings generator 616, and a storage manager 618. Each of these components is described below in turn.

As mentioned, the user embeddings system 104 includes the user data manager 606. In general, the user data manager 606 can receive, access, detect, store, copy, identify, determine, filter, remove, and/or organize user trait data 620. In one or more embodiments, the user trait data 620 includes interactions between a user and content that exhibit user traits as well as other user trait data provided by users. In some embodiments, the user data manager 606 can store and access the user trait data 620 from the storage manager 618 on the computing device 600.

As shown, the user embeddings system 104 includes a user trait sequence generator 608. The user trait sequence generator 608 can identify, analyze, generate, structure, organize, arrange, prioritize, rank, filter, extract, parse, and/or create user trait sequences 622 from the user trait data 620 in preparation to train the LSTM autoencoder model 610. For example, as described above in detail in connection with FIGS. 3A and 3B, the user trait sequence generator 608 can generate user trait sequences 622 by indicating user trait changes for a user as the user reveals or hides user traits over time. In addition, the user trait sequence generator 608 can encode sequential information of user traits and time into the user trait sequences 622, as explained earlier. Further, as shown, the user trait sequence generator 608 can communicate with the storage manager 618 to store and retrieve the user trait sequences 622.

As shown, the user embeddings system 104 includes the LSTM autoencoder model 610. The LSTM autoencoder model 610 includes a number of neural network layers, including an LSTM encoder neural network 612 and an LSTM decoder neural network 614. As described above, the LSTM encoder neural network 612 and the LSTM decoder neural network 614 can include additional layers, such as an embedding layer in the LSTM encoder neural network 612 and a dense layer in the LSTM decoder neural network 614. Additional detail regarding the structure and architecture of the LSTM autoencoder model 610 and the neural network layers are provided above in connection with FIGS. 4A and 4B.

In various embodiments, the user embeddings system 104 trains the LSTM autoencoder model 610 with the user trait sequences 622. For example, as described above, the user embeddings system 104 feeds the user trait sequences 622 into the LSTM encoder neural network 612 to generate user embeddings 624 and then feeds the user embeddings 624 into the LSTM decoder neural network 614 to reconstruct the user trait sequences 622. The user embeddings system 104 utilizes cross-entropy prediction error loss and back propagation to tune the weights, biases, and parameters of the LSTM autoencoder model 400, as previously described in connection with FIGS. 4A-4C.

As shown, the user embeddings system 104 includes the user embeddings generator 616. In general, the user embeddings generator 616 utilizes the trained LSTM autoencoder model 610 to generate learned user embeddings 624. More particularly, the user embeddings generator 616 utilizes the trained LSTM encoder neural network 612 to generate learned user embeddings 624 from the user trait sequences 622. Additional detail regarding generating user embeddings 624 is provided above with respect to FIG. 5.

In some embodiments, the user embeddings generator 616 saves the user embeddings 624 within the storage manager 618, as shown in FIG. 6. In this manner, the user embeddings system 104 can retrieve and utilize the user embeddings 624 at a future time for various applications, as described above. For example, the user embeddings system 104 can utilize the user embeddings 624 to perform various prediction use cases like clustering segmentation, segment expansion, and as input to other deep learning/traditional predictive models.

Each of the components 606-624 of the user embeddings system 104 can include software, hardware, or both. For example, the components 606-624 can include one or more instructions stored on a computer-readable storage medium and executable by processors of one or more computing devices, such as a client device or server device. When executed by the one or more processors, the computer-executable instructions of the user embeddings system 104 can cause the computing device(s) to perform the feature learning methods described herein. Alternatively, the components 606-624 can include hardware, such as a special-purpose processing device to perform a certain function or group of functions. Alternatively, the components 606-624 of the user embeddings system 104 can include a combination of computer-executable instructions and hardware.

Furthermore, the components 606-624 of the user embeddings system 104 may, for example, be implemented as one or more operating systems, as one or more stand-alone applications, as one or more modules of an application, as one or more plug-ins, as one or more library functions or functions that may be called by other applications, and/or as a cloud-computing model. Thus, the components 606-624 may be implemented as a stand-alone application, such as a desktop or mobile application. Furthermore, the components 606-624 may be implemented as one or more web-based applications hosted on a remote server. The components 606-624 may also be implemented in a suite of mobile device applications or "apps." To illustrate, the components 606-624 may be implemented in an application, including but not limited to ADOBE® CLOUD PLATFORM or ADOBE® ANALYTICS CLOUD, such as ADOBE® ANALYTICS, ADOBE® AUDIENCE MANAGER, ADOBE® CAMPAIGN, ADOBE® EXPERIENCE MANAGER, and ADOBE® TARGET. "ADOBE," "ADOBE ANALYTICS CLOUD," "ADOBE ANALYTICS," "ADOBE AUDIENCE MANAGER," "ADOBE CAMPAIGN," "ADOBE EXPERIENCE MANAGER," and "ADOBE TARGET" are either registered trademarks or trademarks of Adobe Systems Incorporated in the United States and/or other countries.

Figure 7:
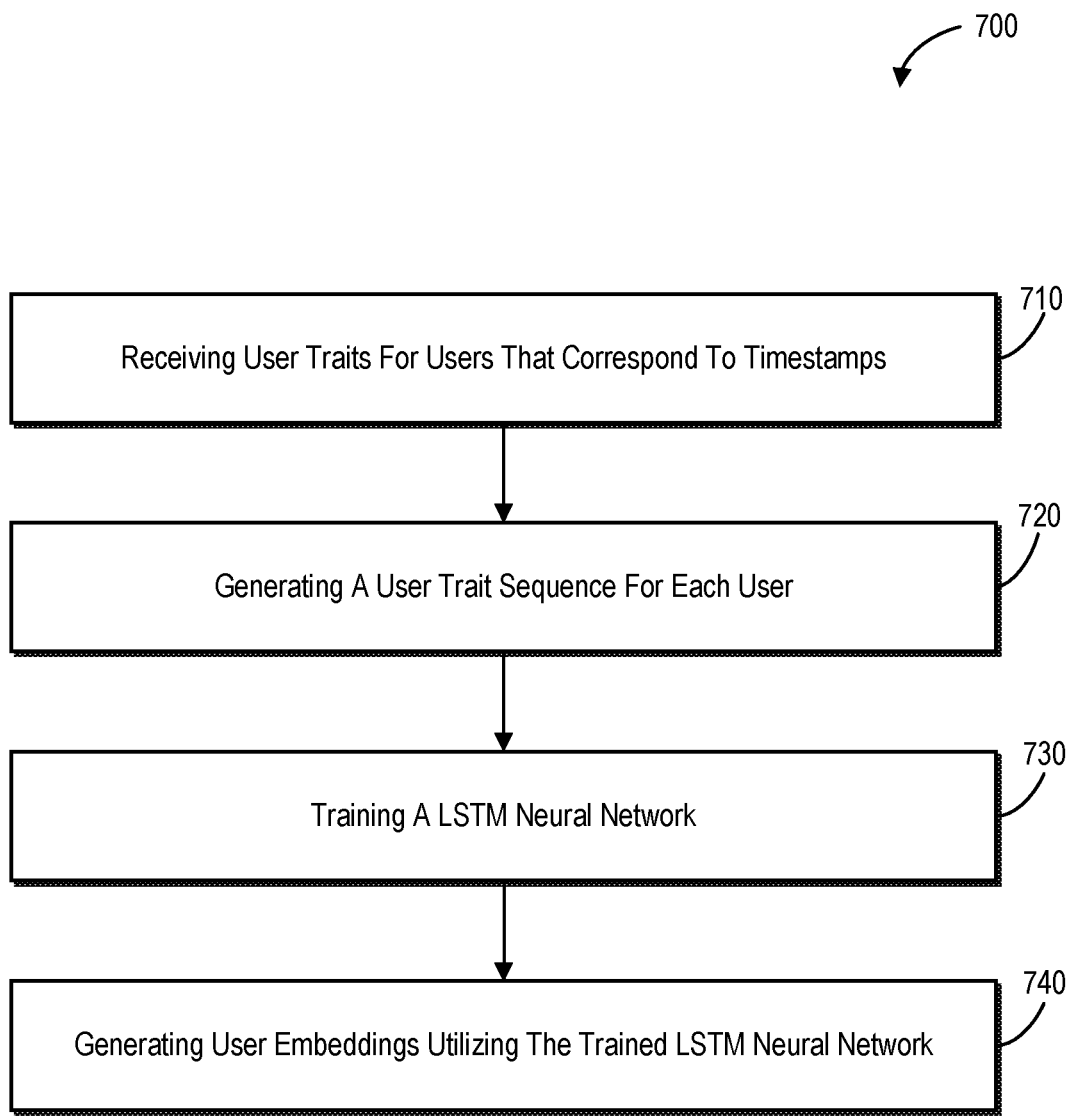
FIG. 7 illustrates a flowchart of a series of acts for generating user embedding representations in accordance with one or more embodiments.

FIGS. 1-6, the corresponding text, and the examples provide a number of different methods, systems, devices, and non-transitory computer-readable media of the user embeddings system 104. In addition to the foregoing, one or more embodiments can also be described in terms of flowcharts comprising acts for accomplishing a particular result, as shown in FIG. 7. Notably, FIG. 7 may be performed with more or fewer acts. Further, the acts may be performed in differing orders. Additionally, the acts described herein may be repeated or performed in parallel with one another or parallel with different instances of the same or similar acts.

As mentioned, FIG. 7 illustrates a flowchart of a series of acts 700 for generating user embedding representations in accordance with one or more embodiments. While FIG. 7 illustrates acts according to one embodiment, alternative embodiments may omit, add to, reorder, and/or modify any of the acts shown in FIG. 7. The series of acts 700 can be performed as part of a method. Alternatively, a non-transitory computer-readable medium can comprise instructions that, when executed by one or more processors, cause a computing device to perform the series of acts 700 of FIG. 7. In some embodiments, a system can perform the series of acts 700.

In one or more embodiments, the series of acts 700 is implemented on one or more computing devices, such as the computing device 600 or the server device 101. In addition, in some embodiments, the series of acts 700 is implemented in a digital environment (e.g., a digital medium environment) for tracking user interactions with content. For example, the series of acts 700 is implemented on a computing device having memory that stores user traits for a plurality of users that correspond to a plurality of timestamps; a user traits dictionary that comprises user traits mapped to identifiers; and/or an LSTM autoencoder model that includes an embedding layer, an LSTM encoder neural network having a first set of LSTM cells, an LSTM decoder neural network having a second set of LSTM cells, and a classification layer.

The series of acts 700 includes an act 710 of receiving user traits for users that correspond to timestamps. In particular, the act 710 can involve receiving user traits for a plurality of users that correspond to a plurality of timestamps. In some embodiments, the act 710 includes receiving user traits for a plurality of users that correspond to a plurality of timestamps. In one or more embodiments, the user traits for a user include changeable characteristics associated with the user.

The series of acts 700 includes an act 720 of generating a user trait sequence for each user. In particular, the act 720 can involve generating a user trait sequence for each user of the plurality of users that includes changes to user traits associated with the user with respect to the plurality of timestamps. In some embodiments, the act 720 includes generating for each user, an initial user trait state of the user trait sequence by identifying user traits for the user at a first timestamp and indicating an addition of each of the identified user traits at the first timestamp in the user trait sequence.

In various embodiments, the act 720 includes generating, for each user, the user trait sequence by identifying user traits for the user at a first timestamp, identifying user traits for the user at a second timestamp, determining a change to one or more user traits from the first timestamp to the second timestamp, and indicating the user trait state change to the one or more user traits in the user trait sequence for the user. In additional embodiments, indicating the user trait state change to the one or more user traits in the user trait sequence for the user includes indicating an addition of a first user trait identified at the second timestamp and not identified at the first timestamp and a removal of a second user trait identified at the first timestamp and not identified at the second timestamp. In additional and/or alternative embodiments, indicating the user trait state change to the one or more user traits in the user trait sequence for the user further includes indicating no change to a first user trait that is identified at the first timestamp and at the second timestamp.

As shown, the series of acts also includes an act 730 of training an LSTM neural network. In particular, the act 730 can involve training an LSTM autoencoder model having an encoder (i.e., LSTM encoder neural network) and a decoder (i.e., LSTM decoder neural network), where the encoder and the decoder each utilize one or more LSTM cells. In various embodiments, the act 730 includes training the LSTM autoencoder model by utilizing the LSTM encoder neural network to generate user embeddings based on input user trait sequences, utilizing the LSTM decoder neural network to determine predicted user trait sequences by decoding the generated user embeddings, comparing the predicted user trait sequences to the input user trait sequences to obtain a prediction loss, back propagating the prediction loss to the LSTM encoder neural network and LSTM decoder neural network to tune the LSTM autoencoder model.

In some embodiments, the decoder of the LSTM autoencoder model outputs a decoded sequence in reverse order from the input sequence being encoded during training. In various embodiments, the decoder of the LSTM autoencoder model receives multiple inputs from the encoder of the LSTM autoencoder model during training that include an encoded user embedding and a history vector output from a last LSTM cell of the encoder. In one or more embodiments, the act 730 includes training the LSTM autoencoder model in a semi-supervised manner utilizing enforced teaching, where enforced teaching includes providing a user trait from a user trait sequence for a user and a given timestamp to the LSTM decoder neural network in place of providing a prediction user trait output generated by the LSTM decoder neural network for a previous timestamp.

As shown, the series of acts 700 additionally includes an act 740 of generating user embeddings utilizing the trained LSTM neural network. In particular, the act 740 can involve generating user embeddings for the plurality of users from the user trait sequences utilizing an LSTM neural network trained to generate user embeddings that encode how traits change over time. In various embodiments, the act 740 includes utilizing the trained LSTM encoder neural network of the trained LSTM autoencoder model to generate user embeddings for each user of the plurality of users.

In additional embodiments, the LSTM neural network includes a dynamic LSTM neural network that adjusts a number of the LSTM cells in the encoder to match a size of a user trait sequence being provided, where the LSTM neural network outputs a uniform user embedding irrespective of the number of LSTM cells in the encoder. In one or more embodiments, the act 740 includes generating an encoded user trait sequence vector at the embedding layer by mapping each user trait in a user trait sequence to an encoded value and providing each encoded numeric value of the encoded user trait sequence vector to an LSTM cell of the first set of LSTM cells within the LSTM encoder neural network.

In one or more embodiments, the series of acts 700 includes additional acts. For example, in some embodiments, the series of act 700 involves an act of generating a user trait dictionary that includes a trait-to-identifier mapping for each user trait included in the identified user traits. In additional embodiments, the series of act 700 includes an act of mapping each user trait in the user trait sequence to the encoded numeric value utilizing the user traits dictionary. In some embodiments, the series of act 700 includes an act of utilizing prediction loss to update the encoded numeric values in the user traits dictionary.

In various embodiments, the user traits include heterogeneous data where a first user of the plurality of users has a different number of user traits than a second user of the plurality of users. In additional embodiments, a first homogenous user embeddings representation corresponding to the first user is the same size as a second homogenous user embeddings representation corresponding to the second user.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 8:
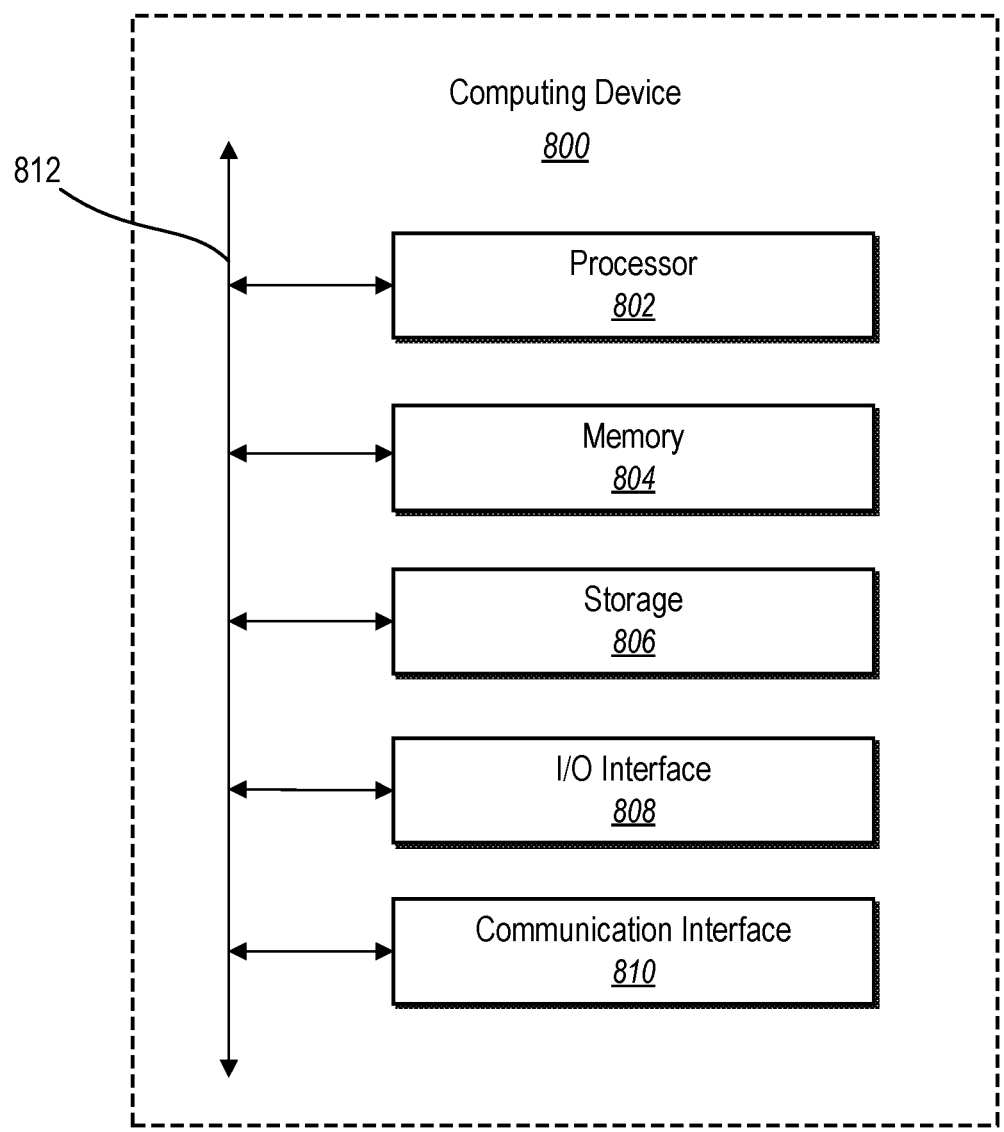
FIG. 8 illustrates a block diagram of an example computing device for implementing one or more embodiments of the present disclosure.

FIG. 8 illustrates a block diagram of an example computing device 800 that may be configured to perform one or more of the processes described above. One will appreciate that one or more computing devices, such as the computing device 800 may represent the computing devices described above (e.g., computing device 600, server device 101, 108, administrator client device, and user client devices 110*a*-

110*n*). In one or more embodiments, the computing device 800 may be a non-mobile device (e.g., a desktop computer or another type of client device). Further, the computing device 800 may be a server device that includes cloud-based processing and storage capabilities. In some embodiments, the computing device 800 may be a mobile device (e.g., a mobile telephone, a smartphone, a PDA, a tablet, a laptop, a camera, a tracker, a watch, a wearable device, etc.).

As shown in FIG. 8, the computing device 800 can include one or more processor(s) 802, memory 804, a storage device 806, input/output interfaces 808 (or "I/O interfaces 808"), and a communication interface 810, which may be communicatively coupled by way of a communication infrastructure (e.g., bus 812). While the computing device 800 is shown in FIG. 8, the components illustrated in FIG. 8 are not intended to be limiting. Additional or alternative components may be used in other embodiments. Furthermore, in certain embodiments, the computing device 800 includes fewer components than those shown in FIG. 8. Components of the computing device 800 shown in FIG. 8 will now be described in additional detail.

In particular embodiments, the processor(s) 802 includes hardware for executing instructions, such as those making up a computer program. As an example, and not by way of limitation, to execute instructions, the processor(s) 802 may retrieve (or fetch) the instructions from an internal register, an internal cache, memory 804, or a storage device 806 and decode and execute them.

The computing device 800 includes memory 804, which is coupled to the processor(s) 802. The memory 804 may be used for storing data, metadata, and programs for execution by the processor(s). The memory 804 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 804 may be internal or distributed memory.

The computing device 800 includes a storage device 806 includes storage for storing data or instructions. As an example, and not by way of limitation, the storage device 806 can include a non-transitory storage medium described above. The storage device 806 may include a hard disk drive (HDD), flash memory, a Universal Serial Bus (USB) drive or a combination these or other storage devices.

As shown, the computing device 800 includes one or more I/O interfaces 808, which are provided to allow a user to provide input to (such as user strokes), receive output from, and otherwise transfer data to and from the computing device 800. These I/O interfaces 808 may include a mouse, keypad or a keyboard, a touch screen, camera, optical scanner, network interface, modem, other known I/O devices or a combination of such I/O interfaces 808. The touch screen may be activated with a stylus or a finger.

The I/O interfaces 808 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 808 are configured to provide graphical data to a display for presentation to a user. The graphical data may be representative of one or more graphical user interfaces and/or any other graphical content as may serve a particular implementation.

The computing device 800 can further include a communication interface 810. The communication interface 810 can include hardware, software, or both. The communication interface 810 provides one or more interfaces for communication (such as, for example, packet-based communication) between the computing device and one or more other computing devices or one or more networks. As an example, and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI. The computing device 800 can further include a bus 812. The bus 812 can include hardware, software, or both that connects components of computing device 800 to each other.

In the foregoing specification, the invention has been described with reference to specific example embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. In a digital medium environment for tracking changes to user characteristics, a computer-implemented method for generating user embedding representations, comprising:
   identifying user trait for a plurality of users and associated timestamps;
   generating a user trait sequence for each user of the plurality of users that comprises changes to user traits associated with the user based on the timestamps; and
   step for generating user embeddings for the plurality of users that encode how traits change over time utilizing the user trait sequences.

2. The computer-implemented method of claim 1, further comprising generating a user trait dictionary that comprises a trait-to-identifier mapping for each user trait included in the identified user traits.

3. The computer-implemented method of claim 1, wherein the user traits comprise heterogeneous data, and wherein a first user of the plurality of users has a different number of user traits than a second user of the plurality of users.

4. The computer-implemented method of claim 3, wherein a vector length of a first user embedding representation corresponding to the first user is a same size as a vector length of a second user embedding representation corresponding to the second user.

5. A non-transitory computer-readable medium storing instructions that, when executed by at least one processor, cause a computer system to:
   receive user traits for a plurality of users that correspond to a plurality of timestamps;

generate a user trait sequence for each user of the plurality of users that comprises changes to user traits associated with the user with respect to the plurality of timestamps; and generate user embeddings for the plurality of users from the user trait sequences utilizing a long short-term memory (LSTM) neural network that encodes the changes to the user traits over time within each of the user trait sequences into the user embeddings, wherein the LSTM neural network is an encoder within an LSTM autoencoder model having the encoder and a decoder, and wherein the encoder and the decoder each utilize one or more LSTM cells.

6. The non-transitory computer-readable medium of claim 5, further comprising instructions that, when executed by at least one processor, cause the computer system to generate, for each user, an initial user trait state of the user trait sequence by:

identifying user traits at a first timestamp for the user; and
indicating an addition of each of the identified user traits at the first timestamp in the user trait sequence for the user.

7. The non-transitory computer-readable medium of claim 5, further comprising instructions that, when executed by at least one processor, cause the computer system to generate, for each user, the user trait sequence by:

identifying user traits for the user at a first timestamp;
identifying user traits for the user at a second timestamp;
determining a change to one or more user traits from the first timestamp to the second timestamp; and
indicating the change to the one or more user traits in the user trait sequence for the user.

8. The non-transitory computer-readable medium of claim 7, wherein indicating the change to the one or more user traits in the user trait sequence for the user comprises indicating:

an addition of a first user trait identified at the second timestamp and not identified at the first timestamp; and
a removal of a second user trait identified at the first timestamp and not identified at the second timestamp.

9. The non-transitory computer-readable medium of claim 7, wherein indicating the change to the one or more user traits in the user trait sequence for the user further comprises indicating no change to a first user trait that is identified at the first timestamp and at the second timestamp.

10. The non-transitory computer-readable medium of claim 5, wherein the user traits for a user of the plurality of users comprise changeable characteristics associated with the user.

11. The non-transitory computer-readable medium of claim 5, wherein the decoder of the LSTM autoencoder model outputs a decoded user traits sequence in reverse order from an input user traits sequence encoded.

12. The non-transitory computer-readable medium of claim 5, wherein the decoder of the LSTM autoencoder model receives multiple inputs from the encoder of the LSTM autoencoder model that comprise an encoded user embedding and a history vector output from a last LSTM cell of the encoder.

13. The non-transitory computer-readable medium of claim 5, wherein the LSTM neural network comprises a dynamic LSTM that adjusts a number of the LSTM cells in the encoder to match a size of an input user trait sequence being provided, and wherein the LSTM neural network outputs a uniform user embedding irrespective of the number of the LSTM cells in the encoder.

14. A system for generating user embeddings that represent a journey of a user's traits over time comprising:
at least one processor;
a memory that comprises:
user traits for a plurality of users that correspond to a plurality of timestamps;
a user traits dictionary that comprises user traits mapped to identifiers; and
a long short-term memory (LSTM) autoencoder model comprising an embedding layer, an LSTM encoder neural network having a first set of LSTM cells, an LSTM decoder neural network having a second set of LSTM cells, and a classification layer;
at least one non-transitory computer-readable storage medium storing instructions that, when executed by the at least one processor, cause the system to:
generate a user trait sequence for each user of the plurality of users by indicating additions and removals of user traits associated with the user over the plurality of timestamps; and
utilize the LSTM encoder neural network of the LSTM autoencoder model to generate user embeddings for each user of the plurality of users by encoding user traits changes over time within each of the user trait sequences into the user embeddings.

15. The system of claim 14, further comprising instructions that, when executed by the at least one processor, cause the system to:
generate an encoded input vector at the embedding layer by mapping each user trait in a user trait sequence to an encoded value; and
providing each encoded numeric value of the encoded input vector to an LSTM cell of the first set of LSTM cells within the LSTM encoder neural network.

16. The system of claim 15, further comprising instructions that, when executed by the at least one processor, cause the system to map each user trait in the user trait sequence to the encoded numeric value utilizing the user traits dictionary.

17. The system of claim 14, further comprising instructions that, when executed by the at least one processor, cause the system to train the LSTM autoencoder model by:
utilizing the LSTM encoder neural network to generate user embeddings based on input user trait sequences;
utilizing the LSTM decoder neural network to determine predicted user trait sequences by decoding the generated user embeddings; and
comparing the predicted user trait sequences to the input user trait sequences to obtain prediction loss; and
back propagating the prediction loss to the LSTM encoder neural network and LSTM decoder neural network to tune the LSTM autoencoder model.

18. The system of claim 17, further comprising instructions that, when executed by the at least one processor, cause the system to train the embedding layer utilizing the prediction loss, wherein training the embedding layer comprises updating encoded numeric values in the user traits dictionary.

19. The system of claim 17, further comprising instructions that, when executed by the at least one processor, cause the system to train the LSTM autoencoder model in a semi-supervised manner utilizing enforced teaching, and wherein enforced teaching comprises providing a user trait change from a user trait sequence for a user and a given timestamp to the LSTM decoder neural network in place of providing a prediction user trait output generated by the LSTM decoder neural network for a previous timestamp.

20. The system of claim 14, wherein the user traits for a user comprise changeable characteristics associated with the user.

\* \* \* \* \*